(12) United States Patent
Gehrig et al.

(10) Patent No.: US 11,976,258 B2
(45) Date of Patent: May 7, 2024

(54) BREWING SYSTEM AND METHOD FOR OBTAINING AND TREATING A WORT IN BEER BREWING OR IN THE BEVERAGE INDUSTRY, AND CORRESPONDING APPLICATIONS

(71) Applicant: ZIEMANN HOLVRIEKA GMBH, Ludwigsburg (DE)

(72) Inventors: Klaus Gehrig, Ludwigsburg (DE); Klaus Karl Wasmuht, Ellingen (DE); Tobias Becher, Schwieberdingen (DE); Konstantin Ziller, Ludwigsburg (DE); Tom Benninghaus, Ludwigsburg (DE)

(73) Assignee: ZIEMANN HOLVRIEKA GMBH, Ludwigsburg (DE)

( * ) Notice: Subject to any disclaimer, the term of this patent is extended or adjusted under 35 U.S.C. 154(b) by 1121 days.

(21) Appl. No.: 16/345,502

(22) PCT Filed: Nov. 2, 2017

(86) PCT No.: PCT/EP2017/078040
§ 371 (c)(1),
(2) Date: Aug. 1, 2019

(87) PCT Pub. No.: WO2018/083168
PCT Pub. Date: May 11, 2018

(65) Prior Publication Data
US 2019/0390145 A1    Dec. 26, 2019

(30) Foreign Application Priority Data

Nov. 3, 2016 (DE) .................. 10 2016 121 016.1

(51) Int. Cl.
*C12C 7/16*    (2006.01)
*C12C 3/12*    (2006.01)
(Continued)

(52) U.S. Cl.
CPC .............. *C12C 7/163* (2013.01); *C12C 3/12* (2013.01); *C12C 5/004* (2013.01); *C12C 7/20* (2013.01); *C12C 7/24* (2013.01); *C12C 7/26* (2013.01)

(58) Field of Classification Search
None
See application file for complete search history.

(56) References Cited

U.S. PATENT DOCUMENTS 1,922,730 A * 8/1933 Gore .................. C12C 7/163
                                                              99/278
3,249,443 A * 5/1966 Reiter ................ C12C 7/00
                                                              99/278
(Continued)

FOREIGN PATENT DOCUMENTS

CN    101748013       6/2010
DE    4234392 A1     4/1994
(Continued)

OTHER PUBLICATIONS

International Search Report (in English and German) and Written Opinion (in German) issued in PCT/EP2017/078040, dated Jan. 23, 2018; ISA/EP.

(Continued)

*Primary Examiner* — John J Norton
(74) *Attorney, Agent, or Firm* — Harness, Dickey & Pierce, P.L.C.

(57) ABSTRACT

The invention relates to a brewing plant for continuously or discontinuously obtaining and treating a wort in the beer brewery or beverage industry; wherein the wort derived based on a surface filtration, is obtained continuously or discontinuously. In a second device the wort obtained as such, is set to a first temperature between 0 and 85° C. after completing of the thermal treatment of the wort; and an enzyme-containing substrate is added by means of an apparatus. Therein, the first apparatus for setting the temperature of the wort to a first temperature is arranged downstream to an apparatus for keeping hot or boiling of the wort. The apparatus is arranged downstream to the first apparatus for setting the temperature of the wort to the first temperature. Moreover, a corresponding method and corresponding uses are suggested.

14 Claims, 6 Drawing Sheets

(51) Int. Cl.
*C12C 5/00* (2006.01)
*C12C 7/20* (2006.01)
*C12C 7/24* (2006.01)
*C12C 7/26* (2006.01)

(56) References Cited

U.S. PATENT DOCUMENTS

| 3,394,647 | A | * | 7/1968 | Reiter | C12C 7/165 |
|---|---|---|---|---|---|
| | | | | | 99/278 |
| 2015/0275158 | A1 | | 10/2015 | Heldt-Hansen et al. | |
| 2017/0313963 | A1 | | 11/2017 | Gehrig et al. | |
| 2017/0319981 | A1 | | 11/2017 | Gehrig et al. | |

FOREIGN PATENT DOCUMENTS

| DE | 19602167 C1 | 1/1997 |
|---|---|---|
| DE | 102014116304 A1 | 5/2016 |
| DE | 102014116305 A1 | 5/2016 |
| DE | 102014116307 A1 | 5/2016 |
| DE | 102014116308 A1 | 5/2016 |
| EP | 3138902 A1 | 3/2017 |

OTHER PUBLICATIONS

Office Action of the Intellectual Property Office of the People's Republic of China issued in Chinese Application No. 201780067494.7, dated Nov. 26, 2021.

Methodological collection of the Central European Brewing Technology Analysis Commission (MEBAK), Brine Technical Analysis Methods, 4th Edition, vol. II, 2002, 2.6.2.

* cited by examiner

| Date | 10.12. | 11.12. | 12.12. | 13.12. | 14.12. | 14.12. | 16.12. | 17.12. | 18.12. | 19.12. | 20.12. |
|---|---|---|---|---|---|---|---|---|---|---|---|
| Day | 0 | 1 | 2 | 3 | 4 | 5 | 6 | 7 | 8 | 9 | 10 |
| Temp. °C | | 13,0 | 13,4 | 13,5 | 13,8 | 13,4 | 12,9 | 12,7 | 12,6 | 12,7 | 6,9 |
| Druck in bar | | 0,20 | 0,20 | 0,25 | 0,50 | 0,20 | 0,50 | 0,50 | 0,50 | 0,20 | 0,20 |
| Extrakt scheinbar GG% | | 9,61 | 7,00 | 6,95 | 5,65 | 4,82 | 4,14 | 3,61 | 3,18 | 2,95 | 2,70 |
| Differenz ES aus EV° zu ES (berechnet) | | -7,00 | -6,95 | -6,95 | -5,65 | -4,82 | -4,14 | -3,61 | -3,18 | -2,95 | -2,70 |
| Vergärungsgrad wirklich % | | 12,41 | | | 42,45 | 48,05 | 53,06 | 56,82 | 59,91 | | |
| Vergärungsgrad scheinbar % | | 14,68 | | | 50,87 | 57,74 | 63,92 | 68,58 | 72,4 | | |

| Date | 10.12. | 11.12. | 12.12. | 13.12. | 14.12. | 15.12. | 16.12. | 17.12. |
|---|---|---|---|---|---|---|---|---|
| Day | 0 | 1 | 2 | 3 | 4 | 5 | 6 | 7 |
| Temp. °C | | | 11,8 | 12 | 11,9 | 11,9 | 6,5 | 5,2 |
| Druck in bar | | | 0,20 | 0,25 | 0,50 | 0,20 | 0,50 | 0,50 |
| Extrakt scheinbar GG% | | 9,87 | 7,50 | 4,80 | 2,19 | 1,70 | 1,60 | 1,60 |
| Differenz ES aus EV° zu ES (berechnet) | | -7,50 | -4,80 | -4,80 | -2,19 | -1,70 | -1,60 | -1,60 |
| Vergärungsgrad wirklich % | | | | | 65,94 | 69,42 | 70,2 | 70 |
| Vergärungsgrad scheinbar % | | | | | 80,04 | 84,42 | 85,39 | 85,23 |

| Date | 09.12. | 10.12. | 11.12. | 12.12. | 13.12. | 14.12. | 15.12. | 16.12. | 17.12. |
|---|---|---|---|---|---|---|---|---|---|
| Day | 0 | 1 | 2 | 3 | 4 | 5 | 6 | 7 | 8 |
| Temp. °C | | | 11,5 | 11,9 | 11,6 | 11,5 | 11,2 | 6,0 | |
| Druck in bar | | | 0,20 | 0,25 | 0,50 | 0,20 | 0,50 | | |
| Extrakt scheinbar | | 8,56 | 7,35 | 4,50 | 2,90 | 1,47 | 1,34 | 1,34 | |
| Differnz ES aus EV° zu ES (berechnet) | | -7,35 | -4,50 | -4,50 | -2,90 | -1,47 | -1,34 | -1,34 | 0,00 |
| Vergärungsgrad wirklich % | | | 26,35 | | | 70 | 71,02 | 71,04 | |
| Vergärungsgrad scheinbar % | | | 31,54 | | | 85,29 | 86,58 | 86,6 | |

BREWING SYSTEM AND METHOD FOR OBTAINING AND TREATING A WORT IN BEER BREWING OR IN THE BEVERAGE INDUSTRY, AND CORRESPONDING APPLICATIONS

The invention relates to a brewery plant and method for obtaining and treating a wort in the brewery or beverage industry and corresponding uses.

INTRODUCTION

The lately presented methods for obtaining wort in the beer brewery and beverage industry which are in contrast to conventional methods not based on a depth filtration or deep bed filtration, but are based entirely or substantially entirely on a surface filtration, in particular on screen filtration, allow lautering at high speed. Thereby, the lauter step and thus, the entire brewing proceedings may be shortened significantly. Such a method is and the corresponding devices are described e.g., in the German patent application publications DE 10 2014 116 304 A1, DE 10 2014 116 305 A1, DE 10 2014 116 307 A1, and DE 10 2014 116 308 A1.

However, when conducting an in-deep observation of the new lauter methods the present inventors have found, that the resulting worts are characterized by a high turbidity which is successfully avoided by the lauter techniques applied conventionally, such as the lauter tun, and the conventional way of operation. This turbidity which is believed to be caused by particles having a size of larger than 5 μm, in particular larger than 20 μm, shows a high ability to penetrate through the surface filter or screen filter applied in the lautering step. Therefore, particles remain in the wort.

Until now, no knowledge was available on how the composition of the worts obtained by the new lauter technology derived from the surface filtration will influence the fermentation and the quality of the resulting beers or beverages.

According to a widespread opinion, one has to worry that the increased turbidity may lead to a deterioration of the fermentation (the so-called "smearing of the yeast") and to a loss of the quality in the following manufacturing steps (e.g., during the filtration of the beer after storage) or in the resulting beer or beverage (quality of flavor, stability of flavor, aging stability, chemical-physical stability, and vulnerability for microbiological infections). Therefore, among the experts of the German and international brewing industry, a majority believes, that obtaining turbid lauter worts should be avoided in view of the fermentation and beer quality. Instead, in general it is believed that during lautering a very high clarity of the wort is a precondition for a high processability of the wort and for obtaining an excellent beer quality.

Moreover, it was found that in particular when applying the new lauter techniques based on surface filtration the fine turbidity and the drawbacks connected thereto may occur when using problematic malts or other raw materials which are difficult to solubilize or digest, or when applying shortened mash methods which mash-off at a relatively low temperature (approx. 65° C. or below).

Consequently, there is a need to further develop the new lauter technology substantially based on surface filtration in order to achieve on one hand, fast lautering having lauter durations of less than 50 minutes, preferably less than 40 minutes, for a large scale brew. On the other hand, an improvement or further improvement of wort quality, in particular in view of the fermentation and the quality of the resulting beer or beverage is to be achieved.

DEFINITIONS

In terms of the invention, the term "brewing plant" includes a plant in the beer brewery or in the beverage manufacturing which is suitable to provide a wort from a mash and to treat the obtained wort by means of a substrate containing enzymes. Therein, the plant may optionally have further components, e.g., a device for comminuting the raw materials, such as a malt mill; a device for preparing a mash, in particular a mash pan or mash tun; a device for thermally treating the wort, in particular a wort kettle; an apparatus for clarifying the wort, in particular a whirlpool; and/or a device for cooling the wort, in particular a plate heat exchanger.

Within the scope of this application, the term "mash" includes the meaning well known to the person skilled in the field of beer and beverages. Therein, "mash" may also include diluted mashs, in particular mixtures of a mash and water, and concentrated mashs, e.g., residual mashs, that is, mashs from which wort or diluted wort have already been separated. Moreover, "mash" may include all types of mashs known to the skilled person, in particular, beer mashs and whiskey mashs. The term "mash" according to the invention may be limited to a carbohydrate-containing medium which is suitable for the manufacturing of beverages, preferably of non-alcoholic beverages, in particular of beer and beer-mixed drinks or beverages based on wort.

Furthermore, the term "wort" according to the invention includes the meaning well known to the person skilled in the field of beer and beverages. Therein, "wort" may also include first wort (first run), kettle-full wort, cast wort, pitching wort, hopped wort, diluted wort, in particular mixtures of wort and water, post runs as well as concentrated worts. Moreover, "wort" may include all kinds of worts known to the skilled person, in particular beer wort. Moreover, the term "wort" according to the invention may be limited to a carbohydrate-containing medium which was obtained from a mash as defined above, in particular by separating solid matters, and suitable for the manufacturing of beverages, preferably of non-alcoholic beverages, in particular of beer and beer-mixed drinks or beverages based on wort.

In accordance with the invention, the term "separating device" or "separation device" is understood to mean any device which is suitable for separating one or more components of a mixture of substances. In particular, "separating device" includes a filter, screen or the like.

In accordance with the invention, "mixing" is understood to mean putting together or bringing together two or more substances. However, this can also include the homogenisation of the resulting mixture.

In accordance with the invention, the term "clarifying" or "clarification" is understood to mean a procedure in which the clarity of a medium is increased by partial or complete separation of turbidity-forming substances, e.g., the at least partly removal of hot trub from the wort in the whirlpool. Furthermore, the term "clarifying" or "clarification" can also include setting a turbidity of a medium.

In terms of the present application, a method or method step is defined as being "continuous" if this method or method step is performed or runs without interruption. However, in accordance with the invention the definition of "continuously" can additionally also include methods or method steps which have one or more interruptions on a time scale to an extend of overall at the most 20%, preferably at the most 15%, preferably at the most 10%, preferably at the most 5%, in particular at the most 2% of the total duration of the relevant method or method step; or have one or more interruptions to an extent of the mass or volumetric flow rate of overall at the most 20%, preferably at the most 15%, preferably at the most 10%, preferably at the most 5%, in particular at the most 2%, of the total mass or volumetric flow rate of the relevant method or method step.

Within the scope of this application, all methods or method steps not covered by the above definition of "continuous" are defined as being "discontinuous" or "batch wise". The definition of "discontinuous" can also include methods or method steps, of which the performance, although effected without interruption, is completed after at the most eight hours, preferably at the most six hours, and in which a predetermined portion of a substrate, such as e.g. a brew, double brew or partial brew and the like of a mash or a wort, is treated or processed.

In terms of the present application, the term "surface" FA, FA1, FA2, . . . of a separating device LT, LT1, LT2, . . . includes the part of the entire outer, i.e. being in contact with the environment, top or peripheral surface of the separating device which has the openings OP for separating a mash or residual mash and thus has a separating or filtering function.

According to the present invention, the term "portion of a mash" means in particular a substance portion which consists of a mash. However, the term is not limited to this, but according to the invention, may also include a substance portion which contains a mash. In particular, the term "portion of a mash" according to the invention may also include mixtures of mash and water or of mash and mash extracts or of mash and wort or the same. Additionally, the term includes also concentrates of a mash. Moreover, the term "portion of a mash" includes also mixtures of at least two mash portions, wherein the mash portions may be derived from the same or different brew.

In the light of the definition of the term "portion of a mash" as outlined above, the corresponding is also true for the term "portion of a mash extract" and "portion containing a wort which has not being heated to more than 80° C. and contains enzymes, preferably a portion of a first wort (first run)", and the mixtures of the portions according to the invention. Therein, the term "a wort which has not being heated to more than 80° C. and contains enzymes" may include a first wort (first run) and also an aqueous dilution or a concentration of a first wort (first run) and in particular, a first wort (first run) diluted with a post run, that is, a conventional wort or kettle-full wort, as long as the wort was not heated such, in particular to not more than 80° C., that the enzymes contained therein and relevant for the particular application and for the effect to be achieved, are completely inactivated or their enzymatic function are substantially deteriorated (in particular slowing down of the turnover of substances or of the reaction speed to below 50% compared to the completion of the portion without being heated). Consequently, the term "portion containing a wort which has not being heated to more than 80° C. and contains enzymes" may also include a first wort (first run) which has not been heated to more than 80° C., a mixture of first wort (first run) and post run or a plurality of post runs, also in diluted or concentrated form, respectively, wherein the mixture has not been heated to more than 80° C.; and a kettle-full wort which has not being heated to more than 80° C. A corresponding interpretation is also valid for other temperatures according to the invention.

The term "kettle-full volume" of the wort is associated with the meaning usually used in the brewery, in particular the total volume of the wort batch right before or at the beginning of thermal treatment of the wort, e.g., keeping hot or boiling.

According to the present invention, "keeping hot" of wort means keeping the wort at a temperature in the range of more than 85° C., preferably more than 90° C., in particular more than 95° C., up to the boiling temperature, e.g., 100° C.

The indications of temperature as provided in this application are not necessarily limited to the exact temperatures, respectively. The temperatures indicated respectively may also temperatures which differ from the indicated value by 2° C. at the most, preferably by 1° C. at the most. For example, the value of 80° C. may also include a range of 78 to 82° C., preferably 79 to 81° C.

Within the scope of the invention, the term "adding" includes mixing of two or more fluids or suspensions. However, according to the invention, the term "adding" is not limited to this. It may also include mixing and homogenization of two or more fluids or suspensions.

Within the scope of the present application a "method of manufacturing beer" includes a method of manufacturing a beer including a non-alcoholic beer or a beer containing beverage or a beverage similar to beer or a precursor thereof. Accordingly, this includes a method of manufacturing a beer wort (method of manufacturing a beer wort). Moreover, a "method of manufacturing beer" may also include method for manufacturing any beverage, in particular, if a raw material is used for manufacturing the beverage which is suitable to be used in the manufacturing of beer and/or if the beverage may be produced by the application of conventional brewery equipment, for example, malt-based beverages or soft drinks.

"Hop substrate" is a substrate or a mixture of substrates, selected from the group, comprising: hops, preferably natural hops; hop products, preferably hop pellets, hop extract, or any other substrate, which contains hop components which are isomerizable, preferably at least one α acid and/or at least one β acid.

"Isomerization substrate" is an aqueous fluid or an aqueous suspension, selected from the group, comprising: water, (beer) mash, (beer) wort, including first wort (first run), post run, last run (last wort) or mixtures, dilutions or concentrates of the substrates named, in particular taken from the beer manufacturing process, respectively.

Within the scope of the present application, "thermal treatment" means keeping hot at above 85° C., preferably above 95° C., or boiling, the duration of which is preferably 40 to 120 minutes, in particular 50 to 90 minutes. The thermal treatment of a wort starts by heating of the wort obtained in the lauter step, in particular of the kettle-full wort, and ends when casting of the wort from the wort kettle is started. Subsequent method steps which include no or no relevant input of heat into the wort, such as conventional trub separation in the whirlpool or stripping of the wort without additional heating, are not part of the thermal treatment of the wort. The thermal treatment of the wort according to the invention which is enriched with an additive, starts at the heating of the enriched wort, preferably starts when reaching a predetermined temperature minimum of 85° C., in particular 95° C., and ends when the casting of the enriched wort in analog manner to casting of the wort as defined above is started.

"Evaporate" means the release of steam or an aerosol from the isomerization substrate or from a mixture containing the isomerization substrate, which traces back to an evaporation of a liquid at or below the boiling temperature thereof.

"Intermediate product or final product of the beer manufacturing process" includes: (beer) mash, (beer) wort, including first wort (first run), post run, last run, kettle-full wort, cast wort, clarified wort or wort obtained after the whirlpool step, cold wort, aerated wort, pitching wort, green beer, young beer, fermenting beer, fermented beer, beer in the phase of maturation or storage, pressure tank beer, bottled beer, completely or partly dealcoholized beer, beer-mixed drinks or any mixtures thereof.

"Setting the temperature of the resulting mixture IG" includes the heating and cooling of the mixture IG to temperature with in the temperature range indicated. However, it also includes maintaining or keeping the temperature of the mixture IG, if the mixture IG has already a temperature within the temperature range indicated at or after mixing in step (3c) (subsequent number 100) or (3b) (subsequent number 101), and thus, no change of the temperature is required in step (3d) (subsequent number 100) or (3c) (subsequent number 101). The same applies to the device feature "device for setting the temperature of the mixture IG.

"Upper half of the vessel KBV" means that part of the interior space of the vessel KBV which is not occupied by a liquid, when a portion of said liquid is filled into the vessel KBV, and the volume of the liquid portion relates to half of the total volume of the interior space of the vessel KBV.

"Upper third of the vessel KBV" means that part of the interior space of the vessel KBV which is not occupied by a liquid, when a portion of said liquid is filled into the vessel KBV, and the volume of the liquid portion relates to two third of the total volume of the interior space of the vessel KBV.

"Lower half of the vessel KBV" means that part of the interior space of the vessel KBV which is occupied by a liquid, when a portion of said liquid is filled into the vessel KBV, and the volume of the liquid portion relates to half of the total volume of the interior space of the vessel KBV.

"Lower third of the vessel KBV" means that part of the interior space of the vessel KBV which is occupied by a liquid, when a portion of said liquid is filled into the vessel KBV, and the volume of the liquid portion relates to one third of the total volume of the interior space of the vessel KBV.

In this application "solid matter" or "solid matters" or "solid components" with respect to suspensions, in particular to wort or a mixture containing wort, means all solid substances which may be determined, e.g., by the method MEBAK volume II, 2002, 2.6.2.

"Additive" is a substrate or mixture of substrates, selected from the group consisting of a hop trub, a hot trub, a cold trub, a kieselguhr, a silica gel, PVPP, bentonite, rice bowls, cereal bowls, wood chips, activated carbon, natural hops, hop pellets, and solid components of natural hops or of hop pellets. Therein, cereal bowls include preferably both of wheat, rye, rice and/or oat.

"Hop substrate" is a substrate or a mixture of substrates, selected from the group, including: hops, preferably natural hops, hop products, preferably hop pellets, hop extract, or another substrate, that has isomerizable hop components, preferably at least one α acid and/or at least one s acid.

"Isomerized hop substrate" is a hop substrate that has isomerized hop components, preferably at least one iso a acid and/or at least one iso P acid.

OBJECT OF THE INVENTION

It is an object of the present invention to provide a brewing plant and a method for obtaining and treating a wort in the beer brewery or beverage industry and respective uses, which are suitable to improve the production and/for the treatment of wort in the beer brewery or beverage industry. In particular, it is an object of the present invention to provide a brewing plant and a method for obtaining and treating a wort in the beer brewery or beverage industry and respective uses, by means of which a wort suitable for the beer or beverage manufacturing may be produced in a short time and at the same time in good or further improved quality, in particular with respect to its composition and fermentability. Moreover, it is an aspect of the invention to provide the corresponding wort and/or a beverage or a beer produced therefrom.

DESCRIPTION OF THE INVENTION

The object as outlined above is solved by the subject matter of the claims and/or the subject matter (numbers 1 to 141) as described herein below.

Thus, the object is solved by brewing plant according to claim 1 or number 1, the method according to claim 5 or 6 or number 70 or 71, the use according to claim 14 or or number 130 to 132, and the wort according to claim 16 or number 144 of the beer or beverage according to claim 16 or number 141. Advantageous embodiments of the present invention are subject matter of the dependent claims or subject matter which are defined in the subsequent numbers.

1. Brewing plant OM for continuously or discontinuously obtaining and treating a wort WO in the beer brewery or beverage industry;
    wherein the wort WO contains at least one wort which is selected from a group, at least consisting of a first wort WO1, a second wort WO2, a third wort WO3, and a fourth wort WO4,
    the brewing plant OM comprising:
    at least one first lauter device LV1 for continuously or discontinuously obtaining a first wort WO1 from a mash MA, at least comprising:
    a first receiving unit AG1 for receiving the mash MA;
    at least one separating device LT1 each having a first surface FA1;
    wherein the first surface FA1 has a plurality or multiplicity of openings OP;
    wherein the lauter device LV1 is preferably suitable for continuously or discontinuously separating the mash MA into the first wort WO1 and a first residual phase RM1 by means of the first surface FA1 of the first separating device LT1;
    wherein the first surface FA1 or a part thereof can be brought into contact with the mash MA, if the mash MA is present in the first receiving unit AG1 for separation into the first wort WO1 and the first residual phase RM1;
    wherein, during the operation of the first lauter device LV1, the first surface FA1 is arranged such that it is movable or can be moved or can be rotated relative to the mash MA received in the first receiving unit AG1, to the first residual phase RM1 and/or to the first receiving unit AG1;
    wherein the brewing plant OM further comprises a second device V2, wherein the second device V2 comprises:
    a first apparatus WK1 for setting the temperature, in particular for cooling, of the wort WO to a first temperature T1 between 0 and 85° C. after completing of keeping hot or boiling of the wort WO; and
    an apparatus AD for adding at least one portion PES of an enzyme-containing substrate ES, preferably at least one portion PMA of a mash MA and/or at least one portion PMAA of at least one mash extract MAA and/or one portion containing an enzyme-containing wort WOE which has not been heated to more than 80° C., preferably one portion PVW of a first wort first run VW, preferably of the first wort WO1, to the wort WO obtained after setting, in particular cooling to, the first temperature T1;

wherein the first apparatus WK1 for setting the temperature, in particular for cooling, of the wort WO is arranged downstream to an apparatus WP for keeping hot or boiling of the wort WO; and wherein the apparatus AD is arranged downstream to the first apparatus WK1 for setting the temperature, in particular for cooling, of the wort WO to the first temperature T1.

According to the invention, the wort WO may consist of the first wort WO1, the second wort WO2, the third wort WO3, the fourth wort WO4, or further worts produced in further separation steps, or may contain the same. It is preferred that the wort WO is a mixture containing or consisting of at least two of the first wort WO1, the second wort WO2, the third wort WO3, the fourth wort WO4, or further worts produced in further separation steps. Still more preferred is if the wort WO is a mixture containing the first wort WO1 and the second wort WO2, and preferably further worts WO3, WO4, . . . , in particular, if further separation steps are present, or consisting of the same. In particular, the wort WO is a mixture containing the first wort WO1, the second wort WO2, the third wort WO3, and the fourth wort WO4, or consists of the same. It is in particular preferred if the wort WO is a mixture containing the first wort WO1 and the second wort WO2, or the first wort WO1, the second wort WO2, and the third wort WO3, or consists of the same.

Therefore, preferred are all or a selection of those worts WO1, WO2, WO3, . . . , produced in the brewing plant OM, preferably in the lauter device LV, in the volume ratio, in which the particular worts are obtained in the process or in any other volume ratio, combined and preferably homogenized, whereby the wort WO emerges, which is then further treated in the other partial devices or partial methods of the invention.

The first apparatus WK1 may be any suitable device known to the skilled person, by means of the temperature of a suspension or of a fluid may be set to a predetermined temperature, preferably a wort cooler, in particular a plate cooler.

The apparatus AD for adding at least one portion PES of an enzyme-containing substrate ES, may be any suitable device known to the skilled person, by means of a suspension or fluid may be added or dosed, preferably a dozing pump.

2. Brewing plant OM according to number 1, characterized in that the least one first separating device LT1 is arranged such in the first lauter device LV1 that by carrying out the relative movement or the rotational movement, the contact of the first surface FA1 or a partial surface thereof with the mash MA being contained in the first receiving unit AG1 may be interrupted for a certain period of time and may be restored after the interruption;

wherein interrupting and restoring of the contact of the first surface FA1 or a part of the same with the mash MA is preferably repeatable.

3. Brewing plant OM according to number 1 or 2, characterized in that the least one first separating device LT1 is arranged such in the lauter device LV1 that by carrying out the relative movement or rotational movement the surface FA or a partial surface thereof leaves the mash MA in the area of the mash level or at the mash level or in the area of the mash surface or at the mash surface, or leaves the mash MA there or the contact to the mash MA is interrupted there, wherein the moving direction of the first surface FA1, as seen in the area of the mash level or at the mash level, and forms with the mash level or mash surface or with the horizontal an angle between 30 to 90°, preferably 45 to 90 0, preferably 60 to 90°, preferably 70 to 90°, preferably 80 to 90 0, preferably 85 to 90 0, preferably 87 to 90°, in particular of 90°.

4. Brewing plant OM according to one of numbers 1 to 3, characterized in that the first lauter device LV1, in particular the at least one first separating device LT1, can be controlled by means of a control device C such that a relative movement or rotational movement of the first surface FA1 is effected during the entire period of treatment of the suspension MA or of the residual mash RM.

5. Brewing plant OM according to one of numbers 1 to 4, characterized in that the at least one first separating device LT1 is arranged with respect to the first receiving unit AG1 such that during the operation of the first lauter device LV1 for separating the mash MA, the first surface FA1 is covered by the mash MA or is immersed in the mash MA at a proportion in the range of 1 to 95%, preferably 5 to 25%, preferably 5 to 20%, preferably 5 to 15%, preferably 5 to 10%, preferably 5 to 95%, preferably 10 to 90%, preferably 15 to 80%, preferably 20 to 80%, preferably 20 to 70%, preferably 20 to 60%, preferably 20 to 50%, preferably 20 to 40%, preferably to 40%, in particular 20 to 30%, if the mash MA is present in the first receiving unit AG1; and the first surface FA1 is arranged to the extend of the residual portion preferably in a first gas-filled space GR1 above the mash MA or protrudes therein.

6. Brewing plant OM according to one of numbers 1 to 5, characterized in that the openings OP have a size or pore size or aperture in the range of 5 to 10,000 μm, preferably 10 to 1,000 μm, preferably 10 to 500 μm, preferably 20 to 400 μm, preferably 25 to 500 μm, preferably 30 to 300 μm, preferably 40 to 250 μm, preferably to 350 μm, preferably 45 to 200 μm, preferably 45 to 100 μm, preferably 55 to 300 μm, in particular 65 to 250 μm.

7. Brewing plant OM according to one of numbers 1 to 6, characterized in that the first separating device LT1 is designed as a separating device having a rotatably mounted shaft or having a rotatably mounted first surface FA1 or as a rotatably mounted separating device or rotatably mounted filter; and/or the first separating device LT1 is disk-shaped or cylindrical or is substantially disk-shaped or cylindrical; and/or wherein the base surface and/or the peripheral surface of the first separating device LT1 is formed partially or completely as a separating or filtering surface, in particular as the first surface FA1; and/or wherein the first separating device LT1 is arranged in the first lauter device LV1 such that the central axis or an axis of rotation of the first separating device LT1 or the first surface FA1 is arranged substantially in parallel with the liquid level of a liquid introduced into the first receiving unit AG1 of the first lauter device LV1, or the central axis or an axis of rotation of the first separating device LT1 or of the first surface FA1 forms, together with the liquid level of a liquid introduced into the first receiving unit AG1 of the first lauter device LV1 or with the horizontal, an angle with a value in the range of 0 to below 90°, preferably 0 to 45°, preferably 0 to 30°, preferably 0 to 20°, preferably 0 to 15°, preferably 0 to 10°, in particular 0 to 5°.

8. Brewing plant OM according to one of numbers 1 to 7, characterized in that the relative movement or rotational movement of the first surface FA1 is effected in an uninterrupted or intermittent manner, in particular at regular time intervals.

9. Brewing plant OM according to one of numbers 1 to 8, characterized in that the first lauter device LV1 forms at least one flow path; and/or a liquid, in particular the mash MA, can flow through the at least one flow path in a manner driven by gravity.

10. Brewing plant OM according to one of numbers 1 to 9, characterized in that the first surface FA1 is formed as a flat or planar surface or as a surface which has a convexly or concavely curved or wavelike or zigzag-shaped contour with respect to the mash MA; and/or
the at least one first separating device LT1, preferably the first surface FA1, has at least one protrusion VO;
wherein the at least one protrusion VO is arranged such that it can be brought into contact with the mash MA;
wherein the at least one protrusion VO is suitable for moving or entraining solid particles, which originate from the mash MA, in the mash MA, and preferably for discharging said solid particles from the mash MA and/or from the first receiving unit AG1; wherein the at least one protrusion VO preferably has a shape in the form of a bar, paddle, star, channel or pocket.

11. Brewing plant OM according to one of numbers 1 to 10, characterized in that the first lauter device LV1 has two first separating devices LT11, LT12;
wherein the two first separating devices LT11, LT12 are each designed as a separating device having a rotatably mounted shaft or as a rotatably mounted separating device or rotatably mounted filter; and/or
wherein the two first separating devices LT11, LT12 are each arranged in the first lauter device LV1 such that the central axis or an axis of rotation of each of the two first separating devices LT11, LT12 or their two first surfaces FA11, FA12 is arranged substantially in parallel with the liquid level of a liquid introduced into the first receiving unit AG1 of the first lauter device LV1, or the central axis or an axis of rotation of each of the two first separating devices LT11, LT12 or their respective first surfaces FA11, FA12 forms, together with the liquid level of a liquid introduced into the first receiving unit AG1 of the first lauter device LV1 or with the horizontal, an angle with a value in the range of 0 to below 90°, preferably 0 to 45°, preferably 0 to 30 0, preferably 0 to 20°, preferably 0 to 15°, preferably 0 to 10°, in particular 0 to 5°; and/or
wherein the two first separating devices LT11, LT12 are arranged with respect to one another in the first lauter device LV1 such that the central axes or an axis of rotation of each of the two first separating devices LT11, LT12 or their first surfaces FA11, FA12 form an angle with a value in the range of 0 to below 90°, preferably 0 to 45°, preferably 0 to 30°, preferably 0 to 20°, preferably 0 to 15°, preferably 0 to 10°, in particular 0 to 5°; and/or
wherein the two first separating devices LT11, LT12 have an identical central axis or axis of rotation or their central axes or axes of rotation are arranged collinearly in the first lauter device LV1; and/or
wherein the two first separating devices LT11, LT12 have a common rotary shaft; and/or
wherein the two first separating devices LT11, LT12 are arranged in the first lauter device LV1 such that the largest spaced interval, which is measured preferably in parallel with the rotary shaft or as a normal spaced interval, between the two first surfaces FA11, FA12 of the two first separating devices LT11, LT12 is in the range of more than 2 cm to 100 cm, preferably 3 to 50 cm, preferably 4 to 30 cm, preferably 5 to 25 cm, preferably 10 to 30 cm, in particular 10 to 20 cm; and/or
the smallest spaced interval, which is measured preferably in parallel with the rotary shaft or as a normal spaced interval, between the two first surfaces FA11, FA12 of the two first separating devices LT11, LT12 is in the range of more than 2 cm to 100 cm, preferably 3 to 50 cm, preferably 4 to 30 cm, preferably 5 to 25 cm, preferably 10 to 30 cm, in particular 10 to 20 cm.

12. Brewing plant OM according to any one of numbers 1 to 11, characterized in that the first separating device LT1 is arranged in the first lauter device LV1 such that the largest spaced interval, which is measured preferably as a normal spaced interval, between the at least one first surface FA1 and a wall of the first lauter device LV1, preferably the first receiving unit AG1, is in the range of more than 2 cm to 100 cm, preferably 3 to 50 cm, preferably 4 to 30 cm, preferably 5 to 25 cm, preferably to 30 cm, in particular 10 to 20 cm; and/or
the smallest spaced interval, which is measured preferably as a normal spaced interval, between the at least one first surface FA1 and a wall of the first lauter device LV1, preferably the first receiving unit AG1, is in the range of more than 2 cm to 100 cm, preferably 3 to 50 cm, preferably 4 to 30 cm, preferably 5 to 25 cm, preferably 10 to 30 cm, in particular 10 to 20 cm.

13. Brewing plant OM according to any one of numbers 1 to 12, characterized in that the first separating device LT1 comprises:
a tub-like first receiving unit AG1 for receiving the mash MA;
at least one first separating device LT1, preferably two first separating devices LT11, LT12, each having a first surface FA1; FA1 1, FIA2;
wherein the at least one first separating device LT1, preferably the two first separating devices LT11, LT12, is formed as a rotatably mounted, disk-shaped or cylindrical filter, respectively;
wherein the at least one first surface FA1 is the base surface of the at least one first separating device LT1 or a part thereof, respectively;
wherein the first surface FA1 is formed in each case as a flat or substantially flat filtering surface having a multiplicity of openings OP;
wherein the first lauter device LV1 is preferably suitable for separating the mash MA into the first wort WO1 and the first residual mash RM1 by means of the first surface FA1;
wherein the respective axis of rotation of the at least one first separating device LT1 is arranged perpendicularly or substantially perpendicularly with respect to the respective first surface FA1;
wherein the respective axis of rotation of the at least one first separating device LT1 forms, together with the liquid level of a liquid introduced into the first receiving unit AG1 or with the horizontal, an angle with a value in the range of 0 to 20, preferably 0 to 15°, preferably 0 to 10°, in particular 0 to 5°;
wherein, when two first separating devices LT11, LTI2 are present, they are arranged in the first lauter device LV1 such that the normal spaced interval between the two first surfaces FAI11, FA12 of the two first separating devices LT11, LT12 is in the range of 3 to 50 cm, preferably 4 to 30 cm, preferably 5 to 25 cm, preferably 10 to 30 cm, in particular 10 to 20 cm; and wherein the at least one first separating device LT1 is arranged with respect to the first receiving unit AG1 such that during the operation of the first lauter device LV1 for separating the mash MA the first surface FA1 is covered by the mash MA or is immersed in the mash MA at a proportion in the range of 1 to 80%, preferably 5 to 25%, preferably 5 to 20%, preferably 5 to 15%, preferably 5 to 10%, preferably 15 to 80%, preferably 20 to 80%, preferably 20 to 70%, preferably 20 to 60%, preferably 20 to 50%, preferably 20 to 40%, preferably 30 to 40%, in particular 20 to 30%, if the mash MA is present in the first receiving unit AG1; and the first surface FA1 is arranged to the extend of the residual portion in a first gas-filled space GR1 above the mash MA or protrudes therein;

wherein the first surface FA1 or a part thereof can be brought into contact with the mash MA, if the mash MA is present in the first receiving unit AG1 for separation into the first wort WO1 and the first residual mash RM1;

wherein, during the operation of the first lauter device LV1, the first surface FA I is arranged such that it is movable or can be moved or can be rotated relative to the mash MA, the first residual phase RM1 and/or the first receiving unit AG1.

14. Brewing plant OM according to one of numbers 1 to 13, characterized in that the first lauter device LV1, in particular the first separating device LT1, can be controlled by means of a first control device C1 such that a relative movement or rotational movement of the at least one first surface FA1 is effected during the entire period of separation of the mash MA.

15. Brewing plant OM according to one of numbers 1 to 14, characterized in that the first separating device LT1 is arranged with respect to the first receiving unit AG1 such that during the operation of the first lauter device LV1 for separating the mash MA the at least one first surface FA1 is respectively covered by the mash (MA) or is immersed in the mash MA at a proportion in the range of 1 to 95%, preferably 5 to 95%, preferably 5 to 25%, preferably 5 to 20%, preferably 5 to 15%, in particular 5 to 10%, if the mash MA is present in the first receiving unit AG1; and the at least one first surface FA1 is arranged to the extend of the residual portion in a first gas-filled space GR1 above the mash MA or protrudes therein.

16. Brewing plant OM according to one of numbers 1 to 15, characterized in that the brewing plant OM further comprises:

at least one second lauter device LV2, wherein the second lauter device LV2 preferably has a design, which is identical to that of the first lauter device LV1 as defined in any one of numbers 1 to 15;

wherein the second lauter device LV2 has a second receiving unit AG2, preferably a receiving vessel, for receiving the first residual mash RM1 or a mixture containing the first residual mash RM1;

wherein the second lauter device LV2 has at least one second separating device LT2 having at least one second surface FA2;

wherein the at least one second surface FA2 has a multiplicity of openings OP;

wherein the second lauter device LV2 is preferably suitable for separating a first residual mash RM1 into a second wort WO2, in particular a first post run NG1, and a second residual mash RM2 continuously or discontinuously by means of the at least one second surface FA2 of the at least one second separating device LT2;

wherein the at least one second surface FA2 can be brought into contact with the first residual mash RM1, if the first residual mash RM1 is present in the second receiving unit AG2 for separation into the second wort WO2 and the second residual mash RM2;

wherein, during the operation of the second lauter device LV2, the at least one second surface FA2 is arranged such that it is movable or can be moved or can be rotated relative to the first residual mash RM1, the second residual mash RM2 and/or the second receiving unit AG2; and wherein the second lauter device LV2, in particular the at least one second separating device LT2, can preferably be controlled by means of a second control device C2 such that the relative movement of the at least one second surface FA2 is effected in an uninterrupted or intermittent manner, in particular at regular time intervals, during the entire period of separation of the first residual mash RM1; and wherein the brewing plant OM, preferably the second lauter device LV2, preferably has a first unit WZ1 for supplying water or a diluted wort, preferably a third wort WO3.

17. Brewing plant OM according to number 16, characterized in that the at least one second separating device LT2 is arranged with respect to the second receiving unit AG2 such that during the operation of the second lauter device LV2 for separating the first residual mash RM1 the at least one second surface FA2 is respectively covered by the first residual mash RM1 or is immersed in the first residual mash RM1 at a proportion in the range of 1 to 95%, preferably 5 to 95%, preferably 5 to 25%, preferably 5 to 20%, preferably 5 to 15%, in particular 5 to 10%, if the first residual mash RM1 is present in the second receiving unit AG2; and the at least one second surface FA2 is preferably arranged to the extend of the residual portion in a second gas-filled space GR2 or protrudes therein, wherein the second gas-filled space GR2 is arranged above or over the first residual mash RM1.

18. Brewing plant OM according to one of numbers 1 to 17, characterized in that the brewing plant OM further comprises:

a third lauter device LV3, wherein the third lauter device LV3 preferably has a design, which is identical to that of the first lauter device LV1 as defined in any one of numbers 1 to 15;

wherein the third lauter device LV3 has a third receiving unit AG3, preferably a receiving vessel, for receiving the second residual mash RM2 or a mixture containing the second residual mash RM2;

wherein the third lauter device LV3 has at least one third separating device LT3 having at least one third surface FA3;

wherein the at least one third surface FA3 has a multiplicity of openings OP;

wherein the third lauter device LV3 is preferably suitable for separating a second residual mash RM2 into a third wort WO3, in particular a second post run NG2, and a third residual mash RM3 continuously or discontinuously by means of the at least one third surface FA3 of the at least one third separating device LT3;

wherein the at least one third surface FA3 can be brought into contact with the second residual mash RM2, if the second residual mash RM2 is present in the third receiving unit AG3 for separation into the third wort WO3 and the third residual mash RM3;

wherein, during the operation of the third lauter device LV3, the at least one third surface FA3 is arranged such that it is movable or can be moved or can be rotated relative to the second residual mash RM2, the third residual mash RM3 and/or the third receiving unit AG3; and wherein the third lauter device LV3, in particular the at least one third separating device LT3, can preferably be controlled by means of a third control device C3 such that the relative movement of the at least one third surface FA3 is effected in an uninterrupted or intermittent manner, in particular at regular time intervals, during the entire period of separation of the second residual mash RM2; and wherein the brewing plant OM, preferably the third lauter device LV3, preferably has a second unit WZ2 for supplying water or a diluted wort, preferably a fourth wort WO4.

19. Brewing plant OM according to number 18, characterized in that the at least one third separating device LT3 is arranged with respect to the third receiving unit AG3 such that during the operation of the third lauter device LV3 for separating the second residual mash RM2 the at least one third surface FA3 is respectively covered by the second residual mash RM2 or is immersed in the second residual mash RM2 at a proportion in the range of 1 to 95%, preferably 5 to 95%, preferably 5 to 25%, preferably 5 to 20%, preferably 5 to 15%, in particular 5 to 10%, if the second residual mash RM2 is present in the third receiving unit AG3; and the at least one third surface FA3 is preferably arranged to the extend of the residual portion in a third gas-filled space GR3 or protrudes therein, wherein the third gas-filled space GR3 is arranged above or over the second residual mash RM2.

20. Brewing plant OM according to one of numbers 1 to 19, characterized in that the brewing plant OM further comprises:

a fourth lauter device LV4, wherein the fourth lauter device LV4 preferably has a design, which is identical to that of the first lauter device LV1 as defined in any one of numbers 1 to 15;

wherein the fourth lauter device LV4 has a fourth receiving unit AG4, preferably a receiving vessel, for receiving the third residual mash RM3 or a mixture containing the third residual mash RM3;

wherein the fourth lauter device LV4 has at least one fourth separating device LT4 having at least one fourth surface FA4, respectively;

wherein the at least one fourth surface FA4 has a multiplicity of openings OP;

wherein the fourth lauter device LV4 is preferably suitable for separating a third residual mash RM3 into a fourth wort WO4, in particular a third post run NG3, and a fourth residual mash RM4, in particular spent grains, continuously or discontinuously by means of the at least one fourth surface FA4 of the at least one fourth separating device LT4;

wherein the at least one fourth surface FA4 can be brought into contact with the third residual mash RM3, if the third residual mash RM3 is present in the fourth receiving unit AG4 for separation into the fourth wort WO4 and the fourth residual mash RM4;

wherein, during the operation of the fourth lauter device LV4, the at least one fourth surface FA4 is arranged such that it is movable or can be moved or can be rotated relative to the third residual mash RM3, the fourth residual mash RM4 and/or the fourth receiving unit AG4; and wherein the fourth lauter device LV4, in particular the at least one fourth separating device LT4, can preferably be controlled by means of a fourth control device C4 such that the relative movement of the at least one fourth surface FA4 is effected in an uninterrupted or intermittent manner, in particular at regular time intervals, during the entire period of separation of the third residual mash RM3; and wherein the brewing plant OM, preferably the fourth lauter device LV4, preferably has a third unit WZ3 for supplying water or a diluted wort.

21. Brewing plant OM according to number 20, characterized in that the at least one fourth separating device LT4 is arranged with respect to the fourth receiving unit AG4 such that during the operation of the fourth lauter device LV4 for separating the third residual mash RM3 the at least one fourth surface FA4 is respectively covered by the third residual mash RM3 or is immersed in the third residual mash RM3 at a proportion in the range of 1 to 95%, preferably 5 to 95%, preferably 5 to 25%, preferably 5 to 20%, preferably 5 to 15%, in particular 5 to 10%, if the third residual mash RM3 is present in the fourth receiving unit AG4; and the at least one fourth surface FA4 is preferably arranged to the extend of the residual portion in a fourth gas-filled space GR4 or protrudes therein, wherein the fourth gas-filled space GR4 is arranged above or over the third residual mash RM3.

22. Brewing plant OM according to one of numbers 1 to 21, characterized in that the brewing plant OM comprises a first unit WZ1, second unit WZ2 and/or a third unit WZ3, respectively, for supplying water or a diluted wort; and wherein the first unit WZ1 preferably is arranged in the brewing plant OM such that the water or the diluted wort may be supplied to the mash MA or the first residual mash RM1 in the first lauter device LV1 and/or downstream to the first lauter device LV1 and upstream to the second lauter device LV2 and/or in the second lauter device LV2; and/or wherein the second unit WZ2 preferably is arranged in the brewing plant OM such that the water or the diluted wort may be supplied to the second residual mash RM2 in the second lauter device LV2 and/or downstream to the second lauter device LV2 and upstream to the third lauter device LV3 and/or in the third lauter device LV3; and/or wherein the third unit WZ3 preferably is arranged in the brewing plant OM such that the water or the diluted wort may be supplied to the third residual mash RM3 in the third lauter device LV3 and/or downstream to the third lauter device LV3 and upstream to the fourth lauter device LV4 and/or in the fourth lauter device LV4.

23. Brewing plant OM according to number 22, characterized in that the first unit WZL, the second unit WZ2 and/or the third unit WZ3 are each formed as an outlet opening, preferably as a nozzle, in particular as a flat jet nozzle, spray head or spray cone.

24. Brewing plant OM according to one of numbers 1 to 23, characterized in that at least one separating device LT, selected from the group consisting of the at least one first separating device LT1, the at least one second separating device LT2, the at least one third separating device LT3, and the at least one fourth separating device LT4, is designed as a separating device having a rotatably mounted separating or filtering surface, in particular having a rotatably mounted surface FA1, FA2, FA3, FA4, or as a rotatably mounted separating device or rotatably mounted filter; and/or
- the at least one separating device LT, selected from the group consisting of the at least one first separating device LT1, the at least one second separating device LT2, the at least one third separating device LT3, and the at least one fourth separating device LT4, is disk-shaped or cylindrical or is substantially disk-shaped or cylindrical, respectively; and/or
- wherein the base surface and/or the peripheral surface of the respective at least one separating device LT or a part of the at least one separating device LT is formed partially or completely as a separating or filtering surface, in particular as the first surface FA1 or the second surface FA2 or the third surface FA3 or the fourth surface FA4; and/or
- wherein the at least one separating device LT, selected from the group consisting of the at least one first separating device LT1, the at least one second separating device LT2, the at least one third separating device LT3, and the at least one fourth separating device LT4, is arranged in the brewing plan OM such that the central axis or an axis of rotation of the at least one separating device LT is arranged substantially in parallel with the liquid level of a liquid introduced into the respective first, second, third, or fourth receiving unit AG1, AG2, AG3, AG4 of the respective first, second, third, or fourth lauter device LV1, LV2, LV3, LV4, or the central axis or an axis of rotation of the at least one separating device LT or its respective first, second, third, or fourth surface FA1, FA2, FA3, FA4 forms, together with the liquid level of a liquid introduced into the respective first, second, third, or fourth receiving unit AG1, AG2, AG3, AG4 of the respective first, second, third, or fourth lauter device LV1, LV2, LV3, LV4 or with the horizontal, an angle with a value in the range of 0 to less than 90°, preferably 0 to 45°, preferably 0 to 30°, preferably 0 to 20°, preferably 0 to 15°, preferably 0 to 10°, in particular 0 to 5°.

25. Brewing plant OM according to one of numbers 1 to 24, characterized in that the openings OP have a size or pore size or aperture in the range of 5 to 10,000 μm, preferably 10 to 1,000 μm, preferably 10 to 500 μm, preferably 20 to 400 μm, preferably 25 to 500 μm, preferably 30 to 300 μm, preferably 40 to 250 μm, preferably to 350 μm, preferably 45 to 200 μm, preferably 55 to 300 μm, preferably 45 to 100 μm, in particular 65 to 250 μm.

26. Brewing plant OM according to one of numbers 1 to 25, characterized in that the relative movement or rotational movement of the at least one first surface FA1, the at least one second surface FA2, the at least one third surface FA3 and/or the at least one fourth surface FA4 is effected in an uninterrupted or intermittent manner, in particular at regular time intervals.

27. Brewing plant OM according to one of numbers 1 to 26, characterized in that during the operation of the first lauter device LV1 for separating the mash MA, the first surface FA1 is covered by the mash MA or is immersed in the mash MA at a proportion in the range of 1 to 95%, preferably 5 to 95%, preferably 5 to 25%, preferably 5 to 20%, preferably 5 to 15%, preferably 5 to 10%, preferably 10 to 90%, preferably 15 to 80%, preferably 20 to 80%, preferably 20 to 70%, preferably 20 to 60%, preferably 20 to 50%, preferably 20 to 40%, preferably 30 to 40%, in particular 20 to 30%.

28. Brewing plant OM according to one of numbers 1 to 27, characterized in that during the operation of the second lauter device LV2 for separating the first residual mash RM1, the second surface FA2 is covered by the first residual mash RM1 or is immersed in the first residual mash RM1 at a proportion in the range of 1 to 95%, preferably 5 to 95%, preferably 5 to 25%, preferably 5 to 20%, preferably 5 to 15%, preferably 5 to 10%, preferably 20 to 90%, preferably 30 to 80%, preferably 35 to 70%, in particular 40 to 60%.

29. Brewing plant OM according to one of numbers 1 to 28, characterized in that during the operation of the third lauter device LV3 for separating the second residual mash RM2, the third surface FA3 is covered by the second residual mash RM2 or is immersed in the second residual mash RM2 at a proportion in the range of 1 to 95%, preferably 5 to 95%, preferably 5 to 25%, preferably 5 to 20%, preferably 5 to 15%, preferably 5 to 10%, preferably 20 to 90%, preferably 30 to 80%, preferably 35 to 70%, in particular 40 to 60%.

30. Brewing plant OM according to one of numbers 1 to 29, characterized in that during the operation of the fourth lauter device LV4 for separating the third residual mash RM3, the fourth surface FA4 is covered by the third residual mash RM3 or is immersed in the third residual mash RM3 at a proportion in the range of 1 to 95%, preferably 5 to 95%, preferably 5 to 25%, preferably 5 to 20%, preferably 5 to 15%, preferably 5 to 10%, preferably 20 to 90%, preferably 30 to 80%, preferably 35 to 70%, in particular 40 to 60%.

31. Brewing plant OM according to one of numbers 1 to 30, characterized in that two, three, four or more, preferably up to ten, devices, selected from the group consisting of the first lauter device LV1, the second lauter device LV2, the third lauter device LV3, and the fourth lauter device LV4, are connected in series and/or in parallel.

32. Brewing plant OM according to one of numbers 1 to 31, characterized in that two, three, four or more first lauter devices LV1 are connected in parallel; and/or
- two, three, four or more second lauter devices LV2 are connected in parallel; and/or
- two, three, four or more third lauter devices LV3 are connected in parallel; and/or
- two, three, four or more fourth lauter devices LV4 are connected in parallel; and/or
- the first lauter devices LV1, the second lauter devices LV2, the third lauter devices LV3 and/or the fourth lauter devices LV4 are connected in series.

33. Brewing plant OM according to one of numbers 1 to 32, characterized in that the brewing plant OM forms at least one flow path; and a liquid or in particular the mash MA, the first residual mash RM1, the second residual mash RM2, the third residual mash RM3 and/or the fourth residual mash RM4 can flow through the at least one flow path preferably in a manner driven by gravity.

34. Brewing plant OM according to one of numbers 1 to 33, characterized in that the brewing plant OM has at least one barrier element;
- wherein preferably a first barrier element is arranged downstream to the first lauter device LV1 and upstream to the second lauter device LV2; and/or wherein preferably a second barrier element is arranged downstream to the second lauter device LV2 and upstream to the third lauter device LV3; and/or wherein preferably a third barrier element is arranged downstream to the third lauter device LV3 and upstream to the fourth lauter device LV4.

40. Brewing plant OM according to one of numbers 1 to 34, characterized in that the apparatus AD for adding of the at least one portion PES of an enzyme-containing substrate ES is arranged upstream or downstream to or in the area of a apparatus WH for clarifying the wort WO.

41. Brewing plant OM according to one of numbers 1 to 40, characterized in that the brewing plant OM at least has one of the following apparatus:
   an apparatus MB for producing a mash MA;
   an apparatus WP for thermal treatment, preferably keeping hot or boiling, of the wort WO produced in the brewing plant OM, preferably a wort kettle;
   an apparatus WH for at least partly clarifying the wort WO, preferably a whirlpool or a decanter; and
   a second apparatus WK2 for at least partly cooling the wort WO that has been treated in the apparatus WH to a second temperature T2 between the first temperature T1 and 0° C., preferably a heat exchanger for cooling the wort WO to a pitching temperature;
   wherein the apparatus AD for adding at least one portion PES of the enzyme-containing substrate ES is arranged preferably upstream to the apparatus WH for clarifying the wort WO.

42. Brewing plant OM according to one of numbers 1 to 41, characterized in that the brewing plant OM further comprises an apparatus WE for heating the wort WO to a third temperature T3 between 82 and 99° C., preferably between 82 and 95° C., preferably between 82 and 90° C., in particular between 82 and 85° C.;
   wherein the apparatus WE for heating the wort WO is arranged preferably downstream to the apparatus WH for clarifying the wort WO; or
   wherein the apparatus WE for heating the wort WO is arranged preferably upstream to or in the area of the apparatus WH for clarifying the wort WO.

43. Brewing plant OM according to one of numbers 1 to 42, characterized in that the brewing plant OM further comprises at least one apparatus SP for obtaining and/or storing of the at least one portion PES of an enzyme-containing substrate ES, preferably of the at least one portion PM of the mash MA and/or of the at least one portion PMMA of the at least one mash extract MAA and/or of the portion PVW containing an enzyme-containing wort WOE which has not been heated to more than 80° C., preferably the portion PVW of the first wort (first run) VW.

50. Brewing plant OM according to one of numbers 1 to 43, characterized in that the brewing plant OM further comprises at least one isomerization apparatus IV for isomerizing of isomerizable hop components in an isomerization substrate IS, comprising:
   a container IB for receiving the isomerization substrate IS or a mixture IG containing the isomerization substrate IS;
   wherein the container IB has an inlet opening EIB for introducing the isomerization substrate IS or the mixture IG into the container IB; wherein the inlet opening EIB is in fluid connection with at least one of the first lauter device LV1, the second lauter device LV2, the third lauter device LV3, and the fourth lauter device LV4;
   wherein the container IB has an outlet opening AIB for withdrawing the isomerization substrate IS or the mixture IG from the container IB;
   wherein the outlet opening AIB is in fluid connection with a vessel L which carries beer or wort;
   wherein the vessel L which carries beer or wort is preferably arranged downstream to the apparatus WII for at least partially clarifying the wort WO, to the wort flow;
   an outlet vent ID for discharging of steam or mist of the isomerization substrate (IS) or of the mixture IG from the container TB; and
   preferably an apparatus for setting the temperature of the mixture IG;
   wherein the container IB is a container which is separate to the apparatus WP for thermal treating the wort WO produced in the brewery plant OM;
   wherein the container IB preferably has an effective volume of 60% or less, preferably 50% or less, and particularly 40% or less, of the effective volume, preferably of the kettle-full volume, of the apparatus WP for thermal treating the wort WO produced in the brewery plant OM.

Therein, the fluid connection of the container IB to at least one of the lauter devices LV1, LV2, LV3, LV4 may be directly, that is, without any installations in the pipe. However, the fluid connection may also be indirectly, that this, with a heat exchanger for tempering the wort WO being interconnected.

Accordingly, the fluid connection from the container IB to the vessel L which carries beer or wort may be directly or indirectly.

Optionally, the container IB has at least one further inlet opening for introducing the hop substrate 1H.

51. Brewing plant OM according to one of numbers 1 to 50, characterized in that the at least one isomerization apparatus IV further comprises a heat exchanger IU for tempering, preferably heating, of the isomerization substrate IS or of the mixture IG;
   wherein the heat exchanger IU is arranged downstream to at least one of the first lauter device LV1, the second lauter device LV2, the third lauter device LV3, and the fourth lauter device LV4; and
   wherein the heat exchanger IU is arranged upstream to the container IB, in particular upstream to the inlet opening EIB; or
   wherein the heat exchanger IU is designed and arranged such that the isomerization substrate IS or the mixture IG may be tempered, preferably heated, while it is contained in the container IB, wherein the heat exchanger IU is preferably designed as wall or jacket and/or bottom heating of the container IB.

52. Brewing plant OM according to number 50 or 51, characterized in that the container IB or at least one bottom of the container IB has a conical shape; and/or
   the container IB or a part of the same has the shape of a cone or truncated cone;
   wherein the opening angle (a) of the cone or truncated cone preferably is from 15 to 120°, in particular 45 to 75°; and/or
   the container IB or a part of the same has the shape of a cylinder or is cylindro-conical, preferably having a sphere, elliptical, or polygonal cross-section.

Due to this design of the container IB an improved sedimentation and thus, separation of the solid hop components is achieved.

Moreover, according to the invention there may be the option of recirculating of solid hop components which have been sedimented in the container IB into the wort WO after obtaining the same in the lauter device V1, LV2, LV3, LV4. In particular, the sediment may be added to the isomerization substrate IS (next batch or downstream) being present in the container IB or in the pipe, by means of the isomerization substrate IS is supplied to the container IB.

53. Brewing plant OM according to one of the number 50 to 52, characterized in that the container IB is suitable to stand a pressure in its inner space, which is below the ambient pressure; and
  preferably has an apparatus for producing a pressure in the inner space of the container IB, which is below the ambient pressure.

60. Brewing plant OM according to one of the numbers 1 to 53, characterized in that the brewing plant OM further comprises at least one clarification device KV for at least partially separating of solid matter from the wort WO, preferably from a cast wort, when the wort WO has a temperature of at least 50° C.,
  wherein the clarification device KV has a container KVB for receiving the wort WO,
  wherein the container KVB is arranged with respect to the flow of the wort WO preferably downstream to the apparatus WP for keeping hot or boiling of the wort WO and preferably downstream to the apparatus AD for adding the at least one portion PES of the enzyme-containing substrate ES; and
  wherein the container KVB is arranged with respect to the flow of the wort WO preferably upstream to the second apparatus WK2 for cooling the wort WO; and
  wherein the container KVB has at least one inlet opening EKVB for introducing the wort WO into the container KVB; and
  wherein the container KVB has at least one outlet opening AKVB for withdrawing the wort WO from the container KVB;
  wherein the clarification device KV has a cooling apparatus KVK;
  wherein the cooling apparatus KVK is suitable, preferably arranged such in the brewing plant OM, to cool the wort WO or only the wort WO, which is present in the upper or lower half of the container KVB, preferably in the upper or lower third of the container KVB, or a partial volume thereof.

It is in particular advantageous, if the clarification device KV according to the invention replaces the apparatus WH for clarifying the wort WO which is e.g., a conventional whirlpool or a decanter or a sedimentation tub.

61. Brewing plant OM according to number 60, characterized in that the container KVB or parts thereof has/have the shape of a cone or truncated cone;
  wherein the opening angle (a) of the cone or truncated cone preferably is from 15 to 120°, in particular 45 to 75°.

62. Brewing plant OM according to number 60 or 61, characterized in that the container KVB or parts thereof has/have the shape of a cylinder or is cylindro-conical, preferably having a sphere, elliptical, or polygonal cross-section.

63. Brewing plant OM according to one of the numbers 60 to 62, characterized in that the cooling apparatus KVK is formed as a jacket cooling or a wall cooling of the container KVB, preferably as a jacket or side one cooling.

64. Brewing plant OM according to one of the numbers 60 to 63, characterized in that the at least one inlet opening EKVB is arranged such that it allows an inflow of the wort WO in tangential or substantially tangential direction relative to the wall of the container KVB, preferably to the jacket or sidewall of the container KVB.

65. Brewing plant OM according to one of the numbers 60 to 64, characterized in that the at least one outlet opening AKVB is formed as a plurality of outlet openings AKVB, wherein the outlet openings AKVB are arranged such that the container KVB or at the wall of thereof, that they allow withdrawing of the wort WO at different locations as regards the height of the container KVB.

70. Method VO for continuously or discontinuously obtaining and treating a wort WO in the beer brewery or beverage industry;
  when the wort WO contains at least one wort which is selected from a group, at least consisting of a first wort WO1, a second wort WO2, a third wort WO3, and a fourth wort WO4;
  wherein the method VO comprises a first partial method TV1 for obtaining the wort WO from a mash MA, at least having the steps:
  (1a) continuously or discontinuously supplying the mash MA to a first receiving unit AG1 of a first lauter device LV1, preferably the first lauter device LV1 as defined in one of the numbers 1 to 15;
  (1b) continuously or discontinuously separating the mash MA in the first lauter device LV1 by means of at least one first separating device LT1 into a first wort WO1 and a first residual mash RM1;
  wherein the mash MA is brought in contact with a first surface FA1 of the at least one separating device LT1;
  wherein the filtrate or permeate is the first wort WO1 and the filter residual or retentate is the first residual mash RM1;
  wherein during the separating of the mash MA into the first wort WO1 and the first residual mash RM1, the first surface FA1 moves relatively to the mash MA, to the first residual mash RM1 and/or to the first receiving unit AG1; or wherein during the separating of the mash MA into the first wort WO1 and the first residual mash RM1, the first surface FA1 rotates around a first axis or first middle axis AX1 of the first separating device LT1; and
  wherein during the entire duration of the separation of the mash MA, the relative movement or rotational movement of the first surface FA1 is effected in an uninterrupted or intermittent manner, in particular at regular time intervals;
  wherein the first wort WO1 preferably has a content of solid matter F of at least 300 mg/L, preferably at least 500 mg/L, preferably at least 1,000 mg/L, in particular at least 2,000 mg/L;
  wherein the method VO further includes a second partial method TV2 for treating the wort WO obtained in the first partial method TV1, at least comprising the steps:
  (2a) after a thermal treatment, preferably keeping hot or boiling, of the wort WO obtained in the first partial method TV1, setting the temperature, in particular cooling, of the wort WO to a first temperature T1 between 0 and 85° C., preferably between 0 and 80° C., preferably between 70 and 85° C., preferably between 72 and 83° C., preferably between 80 and 85° C., preferably between 80 and 82° C., preferably between 72 and 78° C., preferably between 40 and 55° C., preferably between 45 and 50° C.; and
  (2b) adding of at least one portion PES of an enzyme-containing substrate ES, preferably of at least one portion PMA of a mash MA and/or at least one portion PMAA of a mash extract MAA and/or a portion PVW containing an enzyme-containing wort WOE which has being heated to not more than 80° C., preferably not more than 78° C., preferably not more than 76° C., preferably not more than 74° C., preferably not more than 72° C., preferably not more than 70° C., preferably not more than 68° C., in particular not more than 66° C., in particular a portion PVW of a first wort (first run) VW, preferably of the first wort WO1, or preferably of a mixture of at least two of the portion PMA, the portion PMAA and the portion PVW, to the wort WO;
  wherein the wort WO has the first temperature T1 or lower at the time of adding; and
  wherein the second partial method TV2 is preferably carried out by mans of the second device V2, as is defined in one of the numbers 1 to 43.

71. Method VO for continuously or discontinuously obtaining and treating a wort WO in the beer brewery or beverage industry;
  when the wort WO contains at least one wort which is selected from a group, at least consisting of a first wort WO1, a second wort WO2, a third wort WO3, and a fourth wort WO4;
  wherein the method VO comprises a first partial method TV1 for obtaining the wort WO from a mash MA, at least having the steps:
  (1a) continuously or discontinuously supplying the mash MA to a first receiving unit AG1 of a first lauter device LV1, preferably the first lauter device LV1 as defined in one of the numbers 1 to 13;
  (1b) continuously or discontinuously separating the mash MA in the first lauter device LV1 by separating or filtrating the mash MA by means of at least one separating device LT1, preferably of a first surface FA1 of the first separating device LT1, into a first wort WO1 and a first residual mash RM1;
    wherein the filtrate or permeate is the first wort WO1 and the filter residual or retentate is the first residual mash RM1;
    wherein the separation is driven by hydrostatic pressure of the mash MA and/or by another pressure acting on the mash MA and/or by a negative pressure acting on the first residual mash RM1;
    wherein during separating of the mash MA into the first wort WO1 and the first residual mash RM1, a first surface FA1 of the first separating device LT1 moves relatively to the mash MA being present in the first lauter device LV1, to the first residual mash RM1 being present in the first lauter device LV1 and/or to the first receiving unit AG1; or wherein during separating of the mash MA, the first surface FA1 rotates around a first axis or first middle axis AX1 of the first separating device LT1; and
    wherein during the entire duration of the separation of the mash MA the relative movement or rotational movement of the first surface FA1 is effected in an uninterrupted or intermittent manner, in particular at regular time intervals;
    wherein the first wort WO1 preferably has a content of solid matter F of at least 300 mg/L, preferably at least 500 mg/L, preferably at least 1,000 mg/L, in particular at least 2,000 mg/L;
  wherein the method VO further includes a second partial method TV2 for treating the wort WO obtained in the first partial method TV1, at least comprising the steps:

(2a) after a thermal treatment, preferably keeping hot or boiling, of the wort WO obtained in the first partial method TV1, setting the temperature, in particular cooling, of the wort WO to a first temperature T1 between 0 and 85° C., preferably between 0 and 80° C., preferably between 70 and 85° C., preferably between 72 and 83° C., preferably between 80 and 85° C., preferably between 80 and 82° C., preferably between 72 and 78° C., preferably between 40 and 55° C., preferably between 45 and 50° C.; and
(2b) adding of at least one portion PES of an enzyme-containing substrate ES, preferably of at least one portion PMA of a mash MA and/or at least one portion PMAA of a mash extract MAA and/or a portion PVW containing an enzyme-containing wort WOE which has being heated to not more than 80° C., preferably not more than 78° C., preferably not more than 76° C., preferably not more than 74° C., preferably not more than 72° C., preferably not more than 70° C., preferably not more than 68° C., in particular not more than 66° C., in particular a portion PVW of a first wort (first run) VW, preferably of the first wort WO1, or preferably of a mixture of at least two of the portion PMA, the portion PMAA, and the portion PVW, to the wort WO;
  wherein the wort WO has the first temperature T1 at most at the time of adding; and
  wherein the second partial method TV2 is preferably carried out by using the second device V2, as is defined in one of the numbers 1 to 43.

72. Method VO according to number 70 or 71, characterized in that the first partial method TV1 further comprises the steps of:
  (1c) mixing of water or a diluted wort, preferably the third wort WO3, with the first residual mash RM1 obtained at the separation according to step (1b), in a predefined volumetric flow ratio, whereby a first mixture MX1 is obtained;
  (1d) prior to step (1c): continuous or discontinuous supplying the first residual mash RM1 to the second receiving unit AG2 of a second lauter device LV2;
  (1e) after step (1c): continuous or discontinuous supplying the first mixture MX1 to the second receiving unit AG2 of the second lauter device LV2;
    wherein the second lauter device LV2 preferably has the shape which is identical to the first lauter device LV1, as is defined in one of numbers 1 to 15;
  (1f) continuous or discontinuous separating of the thus obtained first mixture MX1 into a second wort WO2 and a second residual mash RM2 by means of the at least one second separating device LT2 or by means of separating or filtrating the first mixture MX1 by use of a second surface FA2 of the second separating device LT2 in the second lauter device LV2;
    wherein the filtrate or permeate is the second wort WO2 and the filter residual or the retentate is the second residual mash RM2;
    wherein the separation is driven by the hydrostatic pressure of the first mixture MX1 and/or another pressure acting upon the first mixture MX1 and/or a negative pressure acting upon the second residual phase RM2;
    wherein, during the separation of the first mixture MX1 into the second wort WO2 and the second residual phase RM2, the second surface FA2 moves relative to the first mixture MX1 present in the second lauter device LV2, to the second residual phase RM2 present in the second lauter device LV2 and/or to the second receiving unit AG2, or during the separation of the first mixture MX1 into the second wort WO2 and the second residual phase RM2, the second surface FA2 rotates about a second axis or second middle axis AX2 of the second separating device LT2; and wherein the relative movement or the rotational movement of the second surface FA2 is effected in an uninterrupted or intermittent manner, preferably at regular time intervals, during the entire period of separation of the first mixture MX1.

73. Method (VO) according to number 72, further comprising the steps:

(1g) mixing of water or a diluted wort, preferably the fourth wort WO4, with the second residual mash RM2 obtained at the separation according to step (1f), in a predefined volumetric flow ratio, whereby a second mixture MX2 is obtained;

(1h) prior to step (1g): continuous or discontinuous supplying the second residual mash RM2 to the third receiving unit AG3 of the third lauter device LV3; or (1i) after step (1g): continuous or discontinuous supplying the second residual mixture MX2 to the third receiving unit AG3 of the third lauter device LV3;

wherein the third lauter device LV3 preferably has the shape which is identical to the first lauter device LV1, as is defined in one of numbers 1 to 15;

(1k) continuous or discontinuous separating of the thus obtained second mixture MX2 into the third wort WO3 and a third residual mash RM3 by means of the at least one third separating device LT3 or by means of separating or filtrating the second mixture MX2 by use of a third surface FA3 of the third separating device LT3 in the third lauter device LV3;

wherein the filtrate or permeate is the third wort WO3 and the filter residual or the retentate is the third residual mash RM3;

wherein the separation is driven by the hydrostatic pressure of the second mixture MX2 and/or another pressure acting upon the second mixture MX2 and/or a negative pressure acting upon the third residual phase RM3;

wherein, during the separation of the second mixture MX2 into the third wort WO3 and the third residual mash RM3, the third surface FA3 moves relative to the second mixture MX2 present in the third lauter device LV3, to the third residual mash RM3 present in the third lauter device LV3 and/or to the third receiving unit AG3, or during the separation of the second mixture MX2 into the third wort WO3 and the third residual mash RM3, the third surface FA3 rotates about a third axis or third middle axis AX3 of the third separating device LT3; and wherein the relative movement or the rotational movement of the third surface FA3 is effected in an uninterrupted or intermittent manner, preferably at regular time intervals, during the entire period of the separation of the second mixture MX2.

74. Method VO according to number 73, further comprising the steps:

(1l) mixing of water or a diluted wort, with the third residual mash RM3 obtained at the separation according to step (1k), in a predefined volumetric flow ratio, whereby a third mixture MX3 is obtained;

(1m) prior to step (1l): continuous or discontinuous supplying the third residual mash RM3 to a fourth receiving unit AG4 of the fourth lauter device LV4; or (1n) after step (1l): continuous or discontinuous supplying the third residual mixture MX3 to the fourth receiving unit AG4 of the fourth lauter device LV4;

wherein the fourth lauter device LV4 preferably has the shape which is identical to the first lauter device LV1, as is defined in one of numbers 1 to 15;

(1o) continuous or discontinuous separating of the thus obtained third mixture MX3 into the fourth wort WO4 and a fourth residual mash RM4 by means of the at least one fourth separating device LT4 or by means of separating or filtrating the third mixture MX3 by use of a fourth surface FA4 of the fourth separating device LT4 in the fourth lauter device LV4;

wherein the filtrate or permeate is the fourth wort WO4 and the filter residual or the retentate is the fourth residual mash RM4;

wherein the separation is driven by the hydrostatic pressure of the third mixture MX3 and/or another pressure acting upon the third mixture MX3 and/or a negative pressure acting upon the fourth residual mash RM4;

wherein, during the separation of the third mixture MX3 into the fourth wort WO4 and the fourth residual mash RM4, the fourth surface FA4 moves relatively to the third mixture MX3 present in the fourth lauter device LV4, to the fourth residual mash RM4 present in the fourth lauter device LV4 and/or to the fourth receiving unit AG4, or during the separation of the third mixture MX3 into the fourth wort WO4 and the fourth residual mash RM4, the fourth surface FA4 rotates about a fourth axis or fourth middle axis AX4 of the fourth separating device LT4; and wherein the relative movement or the rotational movement of the fourth surface FA4 is effected in an uninterrupted or intermittent manner, preferably at regular time intervals, during the entire period of separation of the third mixture MX3.

75. Method VO according to any one of numbers 70 to 74, characterized in that the relative movement is a rotation clockwise or anticlockwise, preferably anticlockwise, wherein the rotational direction is determined from the viewing direction, at which the inflowing medium to be separated, preferably the mash MA or residual mash RM1, RM2, RM3 or the mixture MX1, MX2, MX3 to be separated flows into the device from the left-hand side and the residual mash to be withdrawn leaves the respective lauter device LV1, LV2, LV3, LV4 to the right hand side; and/or the relative movement of the first surface FA1, the second surface FA2, the third surface FA3 and/or the fourth surface FA4 has a speed in the range of 0.01 to 2.5 m/s, in particular 0.01 to 1.8 m/s; and/or the rotation movement of the first surface FA1, the second surface FA2, the third surface FA3 and/or the fourth surface FA4 has a rotation speed in the range of 1 to 60 rpm, preferably 1 to 40 rpm, preferably 1 to 30 rpm, preferably 1 to 20 rpm, in particular 1 to 12 rpm; and/or the rotation movement of the first surface FA1, the second surface FA2, the third surface FA3 and/or the fourth surface FA4 has a tip velocity in the range of 0.01 to lower than 2.0 m/s, preferably 0.05 to 1.8 m/s, preferably 0.1 to 1.5 m/s, in particular 0.2 to 1.5 m/s.

76. Method VO according to any one of numbers 70 to 75, characterized in that the supply of the mash MA in step (1a), the supply of the first residual mash RM1 in step (1d), or of the first mixture MX1 in step (1e), the supply of the second residual mash RM2 in step (1h), or of the second mixture MX2 in step (1i), and/or the supply of the third mixture MX3 in step (1m) or of the third mixture MX3 in step (1n) has a flow velocity in the range of 0.25 to lower than 2.0 m/s, preferably 0.3 to 1.8 m/s, preferably 0.5 to 1.5 m/s, in particular 0.8 to 1.5 m/s.

77. Method VO according to any one of numbers 70 to 76, characterized in that it further comprises the step:
   (1p) using of the wort WO, containing at least one wort, selected from the first wort WO1, the second wort WO2, the third wort WO3, and the fourth wort WO4, for manufacturing a beer, a beer-mixed drink or another beverage.

78. Method VO according to any one of numbers 70 to 77, characterized in that it further comprises the steps of:
   (1q) producing a mixture WOMX from at least two arbitrary worts, in particular from two, three or four arbitrary worts, selected from the group consisting of the first wort WO1, the second wort WO2, the third wort WO3 and the fourth wort (WO4); and
   (1r) using the mixture WOMX resulting in step (1iq) to produce a beer, mixed beer drink or another beverage.

79. Method VO according to any one of numbers 70 to 78, characterized in that during the separation of the mash MA, the contact between the first surface FA1 or a partial surface thereof, and the mash MA present in the first receiving unit AG1 is intermittently interrupted and restored after the interruption has occurred by performing the relative movement or rotational movement of the first surface FA1;
   wherein the interruption and restoration of the contact between the first surface FA1 or a partial surface thereof, and the mash MA is preferably repeated.

80. Method VO according to any one of numbers 70 to 79, characterized in that during the separation of the first residual mash RM1, the contact between the second surface FA2 or a partial surface thereof, and the first residual mash RM1 present in the second receiving unit AG2 is intermittently interrupted and restored after the interruption has occurred by performing the relative movement or rotational movement of the second surface FA2;
   wherein the interruption and restoration of the contact between the second surface FA2 or a partial surface thereof, and the first residual mash RM1 is preferably repeated.

81. Method VO according to any one of numbers 70 to 80, characterized in that during the separation of the second residual mash RM2, the contact between the third surface FA3 or a partial surface thereof, and the second residual mash RM2 present in the third receiving unit AG3 is intermittently interrupted and restored after the interruption has occurred by performing the relative movement or rotational movement of the third surface FA3;
   wherein the interruption and restoration of the contact between the third surface FA3 or a partial surface thereof, and the second residual mash RM2 is preferably repeated.

82. Method VO according to any one of numbers 70 to 81, characterized in that during the separation of the third residual mash RM3, the contact between the fourth surface FA4 or a partial surface thereof, and the third residual mash RM3 present in the fourth receiving unit AG4 is intermittently interrupted and restored after the interruption has occurred by performing the relative movement or rotational movement of the fourth surface FA4;
   wherein the interruption and restoration of the contact between the fourth surface FA4 or a partial surface thereof, and the third residual mash RM3 is preferably repeated.

83. Method VO according to any one of numbers 70 to 82, characterized in that during the separation of the mash MA according to step (1b), the first surface FA1 is covered by the mash MA or is immersed in the mash MA at a proportion in the range of 1 to 95%, preferably 5 to 95%, preferably 5 to 25%, preferably 5 to 20%, preferably 5 to 15%, preferably 5 to 10%, preferably 10 to 90%, preferably 15 to 80%, preferably 20 to 80%, preferably 20 to 70%, preferably 20 to 60%, preferably 20 to 50%, preferably 20 to 40%, preferably 30 to 40%, in particular 20 to 30%, and
   the first surface FA1 is arranged to the extend of the residual portion preferably in a first gas-filled space GR1 over or above the mash MA or protrudes therein.

84. Method VO according to any one of numbers 70 to 83, characterized in that during the separation according to step (1), the second surface FA2 is covered by the first mixture MX1 or is immersed in the first mixture MX1 at a proportion in the range of 1 to 95%, preferably 5 to 95%, preferably 5 to 25%, preferably 5 to 20%, preferably 5 to 15%, preferably 5 to 10%, preferably 10 to 90%, preferably 15 to 80%, preferably 20 to 80%, preferably 20 to 90%, preferably 30 to 80%, preferably 35 to 70%, in particular 40 to 60%.

85. Method VO according to any one of numbers 70 to 84, characterized in that during the separation according to step (1k), the third surface FA3 is covered by the second mixture MX2 or is immersed in the second mixture MX2 at a proportion in the range of 1 to 95%, preferably 5 to 95%, preferably 5 to 25%, preferably 5 to 20%, preferably 5 to 15%, preferably 5 to 10%, preferably 10 to 90%, preferably 20 to 90%, preferably 30 to 80%, preferably 35 to 70%, in particular 40 to 60%.

86. Method VO according to any one of numbers 70 to 85, characterized in that during the separation according to step (1o), the fourth surface FA4 is covered by the third mixture MX3 or is immersed in the third mixture MX3 at a proportion in the range of 1 to 95%, preferably 5 to 95%, preferably 5 to 25%, preferably 5 to 20%, preferably 5 to 15%, preferably 5 to 10%, preferably 10 to 90%, preferably 15 to 80%, preferably 20 to 80%, preferably 20 to 90%, preferably 30 to 80%, preferably 35 to 70%, in particular 40 to 60%.

87. Method VO according to any one of numbers 70 to 86, characterized in that at least one medium, selected from the group consisting of the mash MA, the first wort WO1, the second wort WO2, the third wort WO3, the fourth wort WO4, the first residual mash RM1, the second residual mash RM2, the third residual mash RM3, the fourth residual mash RM4, the first mixture MX1, the second mixture MX2 and the third mixture MX3, is moved during at least one of the steps (1a), (1b), (1d), (1e), (1h), (1i), (1m) and (1n) in a manner driven by gravity, in particular only driven by gravity.

90. Method VO according to any one of numbers 70 to 87, characterized in that the second partial method TV2 further comprises the step:
   (2c) at least partially clarifying of the wort WO;
   wherein the adding according to step (2b) is carried out preferably prior to the at least partially clarifying of the wort WO.

91. Method VO according to any one of numbers 70 to 90, characterized in that the second partial method TV2 further comprises at least one of the followings steps:
   (2d) prior to step (2a): thermal treating, preferably keeping hot or boiling, of the wort WO; and/or
   (2e) after step (2b): cooling the wort WO to a second temperature T2 between the first temperature T1 and 0° C.

92. Method VO according to any one of numbers 70 to 91, characterized in that the first temperature T1 is in the range between 40 and 85° C., preferably between and 84° C., preferably between 40 and 80° C., preferably between 40 and 55° C., between 45 and 50° C., preferably between 50 and 80° C., preferably between 70 and 85° C., preferably between 80 and 85° C., preferably between 70 and 80° C., preferably between 70 and 78° C., preferably between 72 and 78° C., preferably between 72 and 78° C., preferably between 72 and 76° C., preferably between 73 and 75° C., in particular approximately 74° C.

93. Method VO according to any one of numbers 70 to 92, characterized in that the second partial method TV2 further comprises the step:
- (2f) after adding according to step (2b) and allowing a predetermined duration of time to lapse: heating the wort WO to a third temperature T3 between 82 and 99° C., preferably between 82 and 95° C., preferably between 82 and 90° C., particular between 82 and 85° C.

94. Method VO according to any one of numbers 70 to 93, characterized in that the ratio of the volume of the added portion PES of the enzyme-containing substrate ES, preferably of the at least one portion PMA of a mash MA and/or at least one portion PMAA of at least one mash extract MAA and/or one portion PVW containing an enzyme-containing wort WOE which has not been heated to more than 80° C., preferably one portion PVW of a first wort (first run) VW, preferably of the first wort WO1, or a mixture of at least two of the to the portion PMA, the portion PMAA and the portion PVW, to the kettle-full volume of the wort WO is in a range from 0.1 to 30%, preferably 0.5 to 20%, preferably 1 to 5%, preferably 1 to 3%, in particular approximately 2%.

95. Method VO according to any one of numbers 70 to 94, characterized in that the portion PES, preferably of the at least one portion PMA and/or the at least one portion PMAA and/or the portion PVW or a mixture of at least two of these portions is/are stored temporarily prior to the adding according to step (2b).

96. Method VO according to any one of numbers 70 to 95, characterized in that setting the temperature, in particular cooling, of the wort WO to the first temperature T1, and/or cooling the wort WO to the second temperature T2 and/or heating the wort WO to the thrid temperature T3 is carried out in the same heat exchanger.

100. Method VO according to any one of numbers 70 to 96, characterized in that the method VO further comprises a third partial method TV3 for hopping of the wort WO or of a beer or beverage obtained thereof or of a precursor thereof;
wherein the third partial method TV3 at least comprises the steps:
- (3a) providing an isomerization substrate IS containing a wort or consisting of a wort, in particular a post run or a last run, wherein the wort preferably has an extract content in the range from 0.2 to 8° P, preferably from 0.5 to 5° P;
- wherein the isomerization substrate IS preferably has a content of coarse particles having particles sizes of 40 to 400 μm of more than 100 mg/L, preferably of more than 200 mg/L, preferably of more than 400 mg/L;
- (3b) heating of the isomerization substrate IS to a temperature between 80 and 105° C., preferably 93 to 98° C.;
- (3c) mixing the isomerization substrate IS with a hop substrate IH, thereby obtaining a mixture IG;
- wherein the hop substrate IH contains at least one isomerizable hop component, preferably at least one α acid;
- (3d) setting the temperature of the resulting mixture IG to a temperature within a range TB between 80 and 105° C., preferably between 93 and 100° C.;
- wherein the temperature range TB preferably includes the temperatures from 15 25° C. below to 2° C., preferably from 15° C. below to 5° C., below a maximum temperature TMAX attained by the wort WO during the thermal treatment of the same in a beer manufacturing method which includes the method VO, preferably the third partial method TV3; and
- maintaining the temperature of the resulting mixture IG within the range TB for a predetermined period of time tI;
- wherein the period of time tI is preferably by 20 to 50 minutes longer, preferably by 20 to 45 minutes longer, than a period of time tK of the thermal treatment of the wort WO in the beer manufacturing process (expressed as a formula: tI=tK+(20 to 50 min)=(tK+20 min) to (tK+50 min); and
- (3e) preferably at least partly separating of solid components from the mixture IG obtained in step (3d); and
- (3f) mixing of the mixture IG obtained in step (3c) or (3d) or (3e), with the wort WO, which is obtained preferably according to the second partial method TV2, or with a beer or beverage resulting from the wort WO, or with a precursor thereof;
- wherein prior to the mixing of the mixture IG with the wort WO, the wort WO was thermally treated separately from the mixture IG for at least 30 minutes, wherein the maximum temperature TMAX attained by the wort WO; and
- preferably, the solid components of the wort WO, preferably the hot trub, had been removed to at least 80%, preferably to at least 90%, from the wort WO after heating of the wort WO and prior to mixing with the mixture IG; and
- wherein the third partial method TV3 is carried out preferably by use of the isomerization device IV, as is defined in one of the numbers 50 to 53.

The third partial method TV3 is preferably carried out in the order (3a), (3b), (3c), (3d), (3e), (3f). However, the third partial TV3 is not limited to this, but may be designed also as presented herein below:

101. Method VO according to any one of numbers 70 to 96, characterized in that the method VO further comprises a third partial method TV3 for hopping the wort WO or of a beer or of a beverage obtained thereof or of a precursor thereof;
wherein the third partial method TV3 at least comprises the steps:
- (3a) providing an isomerization substrate IS containing a wort or consisting of a wort, wherein the wort preferably has an extract content in the range from 0.2 to 8° P, preferably from 0.5 to 5° P,
- wherein the isomerization substrate IS preferably has a content of coarse particles having particles sizes of 40 to 400 μm of more than 100 mg/L, preferably of more than 200 mg/L, preferably of more than 400 mg/L;
- (3b) mixing the isomerization substrate IS with a hop substrate IH, thereby obtaining a mixture IG;
- wherein the hop substrate IH contains at least one isomerizable hop component, preferably at least one a acid;
- (3c) setting the temperature of the resulting mixture IG to a temperature within the range TB of 80 to 105° C., preferably 93 to 100° C.;
- wherein the temperature range TB preferably includes the temperatures from 15° C. below to 2° C., preferably from 15° C. below to 5° C., below a maximum temperature TMAX attained by the wort WO during the thermal treatment of the same in a beer manufacturing method which includes the method VO, preferably the third partial method TV3; and (3d) maintaining the temperature of the resulting mixture IG within the range TB for a predetermined period of time tI;

wherein the period of time tI is preferably by 20 to 50 minutes longer, preferably by 20 to 45 minutes longer, than a period of time tK of the thermal treatment of the wort WO in the beer manufacturing process (expressed as a formula: tI=tK+(20 to 50 min)=(tk+20 min) to (tK+50 min); and (3e) preferably at least partly separating solid components from the mixture IG obtained in step (3d); and (3f) mixing of the mixture IG obtained in step (3b) or (3c) or (3d) or (3e) with the wort WO, which is obtained preferably according to the second partial method TV2, or with a beer or beverage resulting from the wort WO, or with a precursor thereof;

wherein prior to the mixing of the mixture IG with the wort WO, the wort WO was thermally treated separately from the mixture IG for at least 30 minutes, wherein maximum temperature TMAX attained by the wort WO; and preferably, the solid components of the wort WO, preferably the hot trub, had been removed to at least 80%, preferably to at least 90%, from the wort WO, after heating of the wort WO and prior to mixing with the mixture IG; and wherein the third partial method TV3 is carried out preferably by use of the isomerization device IV, as is defined in one of the numbers 50 to 53.

In step (3d) the period of time tK of the thermal treatment preferably is 40 to 120 minutes, in particular 50 to 90 minutes. Consequently, the period of time tI of maintaining or keeping the temperature of the mixture IG obtained in step (3d) preferably is 60 to 150 minutes, in particular 70 to 135 minutes.

According to the invention, the temperature range TB of the temperature of the mixture IG as recited in step (3c/3d) extends to a range from 15° C. below the maximum temperature TMAX attained by the wort WO during the thermal treatment thereof, to 2° C. below this maximum temperature TMAX. Expressed in a formula: TB=(TMAX −15° C.) to (TMAX—2° C.). As an explaining example it may be added: if the maximum temperature attained by the wort WO during the thermal treatment of the same, is TMAX, for example, a wort boiling temperature of 100° C., the temperature range TB extends between (100-15) ° C. and (100-2) ° C.=85 to 98° C.

102. Method VO according to any one of numbers 70 to 101, characterized in that at least during the step (3d) the mixture IG is allowed to evaporate;

wherein the evaporation of the mixture IG is carried out against atmospheric pressure or against the pressure below the atmospheric pressure.

103. Method VO according to any one of numbers 70 to 102, characterized in that the isomerization substrate IS contains a last run and/or last wort or consists thereof.

104. Method VO according to any one of numbers 70 to 103, characterized in that in step (3d) the period of time tI is at least 60 minutes, preferably at least 90 minutes, in particular at least 120 minutes.

110. Method VO according to any one of numbers 70 to 104, characterized in that the method VO further includes a fourth partial method TV4 for at least partially clarifying the wort WO, preferably of a cast wort, preferably by means of the clarification device KV according to one of numbers 60 to 65;

wherein the fourth partial method TV4 at least includes the steps:

(4a) introducing the wort Wo be clarified in a container KVB for receiving the wort WO through at least one inlet opening EKVB;

wherein the wort WO flowing into the container KVB has a temperature of at least 50° C.

(4b) allowing the wort WO to rest in the container KVB for a predetermined period of time tS, wherein the solid matter contained in the wort WO sediment at least partly;

(4c) withdrawing the resulting, clarified wort WO from the container KVB through at least one outlet opening AKVB;

wherein during the step (4b), the wort WO being present in the container KVB or a partial volume thereof is cooled in the area of the upper or lower half of the container KVB, preferably in the area of the upper or lower third of the container KVB; and wherein the fourth partial method TV4 is preferably carried out by using the clarification device KV as is defined in one of the numbers 60 to 65.

111. Method VO according to number 110, characterized in that during the step (4b) the wort WO being contained in the area of the upper or lower half of the container KVB, preferably in the area of the upper or lower third of the container KVB, is cooled to a temperature which is lower than a temperature of the wort WO flowing into the container KVB by at least 10° C., preferably by at least 20° C.

112. Method VO according to number 110 or 111, characterized in that in step (4a) the introduction of the wort WO is carried out by flowing-in of the wort WO in a tangential or a substantially tangential direction relative to the wall of the container KVB.

113. Method VO according to one of the numbers 110 to 112, characterized in that in step (4c), withdrawing of the wort WO is carried out at different positions with respect to the height of the container KVB.

114. Method VO according to one of the numbers 110 to 113, characterized in that in step (4c), withdrawing of the wort WO is carried out by means of a plurality of outlet openings AKVB;

wherein withdrawing started at the first outlet opening AKVB1, which is covered by wort WO and which has the shortest distance of all outlet openings AKVB to the highest level WS of wort WO which is reached in the container KVB when carrying out the method VO;

wherein after a first predetermined period of time tS1 has lapsed since the beginning of the withdrawing of the wort WO, or after the withdrawal of a first predefined wort volume WOV1 since the beginning of the withdrawal, the withdrawal is continued through a second outlet opening AKVB2, instead of the withdrawal through the first outlet opening AKVB1, or in addition to the withdrawal through the first outlet opening AKVB1, wherein the second outlet opening AKVB2 is covered by the wort WO and has the second by the shortest distance of all outlet openings AKVB to the highest level WS of wort WO which is reached in the container KVB when carrying out the method VO; and wherein after a second predetermined period of time tS2 has lapsed since the beginning of the withdrawing of the wort WO, or after the withdrawal of a second predefined wort volume WOV2 since the beginning of the withdrawal, the withdrawal is continued through a third outlet opening AKVB3, instead of the withdrawal through the first outlet opening AKVB1 and/or through the second outlet opening AKVB2, or in addition to the withdrawal through the first outlet opening AKVB1 and/or through the second outlet opening AKVB2, wherein the third outlet opening AKVB3 is covered by the wort WO and has the third by the shortest distance of all outlet openings AKVB to the highest level WS of wort WO which is reached in the container KVB when carrying out the method VO.

120. Method VO according to one of the numbers 70 to 114, characterized in that the method VO has a fifth partial method TV5 for treating a wort WO containing solid matter and preferably, for hopping a wort WO;
    wherein the fifth partial method TV5 at least comprises the steps:
    (5a) providing the wort WO, preferably the wort WO according to the first partial method TV1; and
    (5b) mixing of the wort WO with an additive Z, thereby obtaining a wort WO containing the additive Z, preferably prior to step (2a) or prior to or during step (2d) according to the second partial method TV2;
    wherein the additive Z contains at least one material, selected from a group, consisting of a hop trub, a hot trub, a cold trub, a kieselguhr, a silica gel, a PVPP, a bentonite, rice bowls, cereal bowls, wood chips, activated carbon, natural hops, hop pellets, and solid components of natural hops or of hop pellets.

121. Method VO according to number 120, characterized in that the method (MO) further contains the step:
    (5c) at least partial homogenization of the wort WO obtained in step (5b) and containing the additive Z, preferably prior to step (2a) or prior to or during step (2d) according to the second partial method TV2.

122. Method VO according to number 120 or 121, characterized in that the method MO further contains the step:
    (5d) Thermal treating, preferably keeping hot at a temperature of at least 95° C. or boiling, of the wort WO obtained in step (5b) or (5c) and containing the additive Z, preferably prior to step (2a) or prior to or during step (2d) according to the second partial method TV2.

123. Method VO according to one of the numbers 120 to 122, characterized in that the method MO further contains the step:
    (5e) Mixing of the wort WO obtained in step (5b), (5c), or (5d) and containing the additive Z with a hop substrate, preferably with an isomerized hop substrate, the hop substrate IH or the mixture IG according to the third partial method TV3;
    wherein the mixing according to a step (5e) is carried out preferably 5 to 15 minutes prior to completion of the thermal treatment according to a step (5d).

124. Method VO according to one of the numbers 120 to 123, characterized in that the method MO further contains the step:
    (5f) Prior to step (5e), preferably after step (5d) and prior to step (5e), at least partially removing the solid matter F in the wort WO containing the additive Z to a content of solid matter F of not more than 100 mg/L, preferably not more than 70 mg/L.

130. Use of the brewery plant OM according to one of the numbers 1 to 65 in the beer brewery or beverage industry for continuously or discontinuously obtaining a wort WO from a mash MA and for continuously or discontinuously treating the wort WO.

131. Use of the brewery plant OM according to one of the numbers 1 to 65 in the beer brewery or beverage industry for the manufacturing of a beer or another alcoholic or nonalcoholic beverage, preferably of a beverage based on wort or a beer-mixed drink, or a precursor thereof.

132. Use of an enzyme-containing substrate ES for treating a wort WO; wherein the wort WO has a content of solid matter F of at least 300 mg/L, preferably at least 500 g/L, preferably at least 1,000 mg/L, in particular at least 2,000 mg/L; and/or
    wherein the wort WO is obtained by means of a surface filtration.

140. Wort WO or a beer or beverage or a precursor thereof manufactured using the wort WO;
    wherein the wort (WO) is manufactured using the brewery plant OM according to one of the numbers 1 to 65; and/or
    wherein the wort is manufactured and treated by means of the method VO according to one of numbers 70 to 124.

141. Beer or beverage or a precursor of the beer or of the beverage, wherein the beer or the beverage or the precursor thereof is manufactured using the wort WO according to number 140.

The present invention is based on the observation of the inventors according to which the quality of the worts which are obtained by means of the novel methods for rapid lautering of a mash in the beer or beverage manufacturing which are based substantially or completely on surface filtration, and which have an intensive fine turbidity compared to conventionally manufactured worts, may be improved due to the application of an enzyme-containing substrate. In terms of the features and advantages of the rapid lautering according to the first partial method of the present invention it is referred to pages 23 to 40 and 56 to 65 of the German patent application DE 10 2014 116 308 and the text passages and numbers (pages 4 to 22) cited therein as well as the FIGS. 1 to 4 including the corresponding parts of the description and the claims of the same application, to which it is referred herein in its entirety.

With these lauter devices, due to the relative movement between the mash and the surface of a separating device, the formation of a filter layer consisting of mash components is avoided, at least to a great extent. Thereby, the flow channels in the surface of the separating device having openings are kept open, so that the wort faces a smaller flow resistance compared to the conventional wort manufacturing methods, when flowing through the surface of the separating device.

In contrast to the classical lauter tun or mash filter a relative movement of the separating device to the mash avoids a formation of a substantial filter layer consisting of mash components during the passage of the wort particles and the solid matter is retained on the surface of the separating device. With the mash coming in contact with a kind of "fresh" surface suitable for separation, permanently or at least part-time due to the relative movement, the flow resistance of the wort when flowing through the separating device remains unchanged high during the course of separation.

With the mash separation as described above, substantially only coarse particles are separated. In contrast to conventional wort manufacturing methods, such as the lauter tun, an increased amount of finer mash components (the so-called fine dough) are transferred into the wort. Consequently, as regards the mash separation according to the invention, a wort is obtained having a turbidity and a solid content that are higher then usually desired or intended. On the other hand, the new separation technologies allow a tremendous shortening of the time required for lautering. According to the invention, a big-scale brew may be separated in 45 minutes, 30 minutes or in even shorter time.

Since according to the invention only a minimum blocking of the surface of the separating device occurs, if any, even with high volume throughput of the mash, the production of the wort may be carried out continuously or discontinuously and with long filter life time. In contrast to the conventional lautering methods (lauter tun; mash filter) conducted as batch methods, the present invention achieves shorter separation times, smaller devices and other advantages connected to continuous methods, when designed as a continuous method VO or a continuously operated device or brewing plant OM.

Despite the high turbidity of the wort obtained by the novel lauter technology according to the first lauter device or the first partial method according to the invention, only little was known as regards its composition and characteristics. In their investigations, the inventors of the present application have found out that the turbid worts obtained lead to a faster fermentation including an accelerated decrease of extract and higher final (apparent) attenuations.

In the fermentation trials as presented in the above diagrams, the final attenuation degree of the worts obtained by surface filtration was already achieved after approximately five days from pitching (even with a lower temperature of 12° C.). In contrast, the final attenuation degree of the worts obtained conventionally by a lauter tun was achieved in eight days at the earliest (at a higher temperature of 13 to 14° C.).

Moreover, the apparent actuation degree was significantly increased with the worts obtained by surface filtration according to the invention (85 to 86%; achieved after six days at the latest) compared to the lauter tun wort (approximately 72%; achieved after eight days).

Moreover, the inventors have found out that the worts obtained by means of surface filtration are characterized by significantly increased contents of zinc and long-chain fatty acids, in particular unsaturated long-chain fatty acids, such as palmitic acid, linoleic acid, and linolenic acid, compared to conventional worts obtained by means of a lauter tun with all other conditions being identical (cf. Table I below).

TABLE 1 comparison of the contents of Zn and different long-chain fatty acids in the wort depending on the manufacturing method (conventionally by means of lauter tun; novel by means of surface filtration and according to the invention by means of surface filtration and enzyme treatment; methods according to MEBAK)

| No. | Method for obtaining the wort | zinc Zn [mg/L] | palmitic acid C16:0 [mg/L] | linoleic acid C18:2 [mg/L] | linolenic acid C18:3 [mg/L] |
|---|---|---|---|---|---|
| 1 | lauter tun | 0.080 | 0.278 | 0.422 | 0.069 |
| 2 | surface filtration | 0.200 | 1.124 | 2.360 | 0.207 |
|   | Δ (2) zu (1) | +150% | +304% | +459% | +200% |
| 3 | surface filtration + enzyme treatemnt | 0.320 | 1.280 | 2.440 | 0.214 |
|   | Δ (3) zu (2) | +60% | +13.9% | +3.4% | +3.4% |

Herein, it is surprising that due to a combination of obtaining the wort by means of a lauter process which is substantially based on the principle of surface filtration (first partial method of the invention) and treating the wort obtained in this manner according to the inventive second partial method, the quality of the wort can further be improved.

The inventors found out, that the content of zinc and long-chain fatty acids in the wort (wort at the point of time after half of the volume thereof has been cooled) may further be increased by means of the inventive combination of first and second partial method or the first lauter device LV1 and the second device V2 according to the number 1 defined above. Moreover, the content of zinc of the wort may be increased by additional 60% compared to the rapidly lautered wort obtained by the first partial method. Additionally, the content of the important fatty acids palmitic acid, linoleic acid, and linolenic acid increased by additional 3 to 14% (cf. table 1 above).

Moreover, the inventors have found, that the filterability of the beer resulting from the wort WO may be enhanced due to the method according to the invention or the application of the brewing plant according to the invention. The high turbidity of the wort WO during lautering of the same is connected to a high load of dextrins which may be the reason for the blocking of the filter during the later beer filtration. This drawback is overcome by carrying out the second partial method TV2 or the application of the second device V2, so that no deteriorations as regards the filterability could be determined anymore compared to the beers conventionally produced.

Moreover it was found, that the wort obtained and treated according to the invention provides an optimal nutrition of the yeast because it is excellently equipped with nutritions, for example with long-chain fatty acids. Because ofthis, the aeration of yeast during pitching may be reduced tremendously, which is connected to a number of technological advantages. Moreover, it was observed, that the yeast multiplication strongly increases when applying the wo obtained and treated according to the invention. Therefore, the yeast dosage may be reduced.

TABLE 2 comparison of the total number of yeast cells during the fermentation depending on the manufacturing method of the wort (surface filtration and surface filtration combined with enzyme treatment)

| total number of the yeast cells during the fermentation | surface filtration | surface filtration + enzyme treatment (according to the invention) | Δ |
|---|---|---|---|
| day 1 | 1.51 * $10^7$/ml | 1.40 * $10^7$/ml | −7.3% |
| day 2 | 0.66 * $10^7$/ml | 4.75 * $10^7$/ml | +620% |
| day 3 | 4.28 * $10^7$/ml | 4.82 * $10^7$/ml | +12.6% |
| day 4 | 1.30 * $10^7$/ml | 3.03 * $10^7$/ml | +133% |

TABLE 3 comparison of the number of the viable yeast cells during the fermentation depending on the manufacturing method of the wort (surface filtration and surface filtration combined with enzyme treatment)

| number of viable yeast cells during the fermentation | surface filtration | surface filtration + enzyme treatment (according to the invention) | Δ |
|---|---|---|---|
| day 1 | 0.81 * $10^7$/ml | 0.94 * $10^7$/ml | +16.0% |
| day 2 | 0.48 * $10^7$/ml | 3.34 * $10^7$/ml | +596% |
| day 3 | 2.95 * $10^7$/ml | 3.55 * $10^7$/ml | +20.3% |
| day 4 | 1.00 * $10^7$/ml | 1.95 * $10^7$/ml | +95.0% |

As reproduced in the above tables 2 and 3, a good multiplication of yeast, in particular during the third day of fermentation, was observed in the fermentation trial as regards the wort which has been manufactured by means of surface filtration.

If in accordance with the invention, the manufacturing of the wort by means of surface filtration (first partial method TV1) is supplemented by the enzyme treatment of the wort (second partial treatment TV2) the total cell number as well as the number of viable cells are further increased. Therefore, during the fourth fermentation day, that is during the peak phase of the fermentation, the total cell number as well as the number of viable cells are approximately double of the number as with the wort obtained by surface filtration without enzyme treatment, respectively.

Moreover it was found, that the method according to the invention is also suitable for processing of mashs which are made from malt or other raw materials which are difficult to solubilize. Further, the method according to the invention is suitable for processing mashs which were obtained applying a shortened mashing method, which are characterized by a relatively low final mashing temperature (approx. 65° C. or below). The difficulties usually occurring in these cases, such as a low filterability, do not occur with the worts obtained according to the invention or at least, occur to a lower extend.

Hereby, it is disclosed that the partial devices of the brewing plant OM according to the invention, namely the lauter device LV, the second device V2, the isomerization device IV and the clarification device KV, as they are defined in the numbers 1 to 65 above, may also be operated as single devices, independent of each other, in an advantageous way. Thus, hereby also all partial devices as described above are disclosed separately.

In analog manner, it is true for the method: the partial methods of the inventive method, that is the first partial method TV1, the second partial method TV2, the third partial method TV3, the fourth partial method TV4, and the fifth partial method TV5, as they are defined in the above numbers 70 to 124, respectively, may also be conducted as single methods, independent of each other, in an advantageous way. Thus, hereby also all partial methods as described above are disclosed separately.

Further disclosure, alternatives and advantages of the first, the second, the third and/or the fourth lauter device LV1, LV2, LV3, LV4 and of the first partial method TV1.

According to the invention, the surface of the separating device and/or the separating device as such may for example consists of stainless steel, copper, plastics, preferably polypropylene, or a tissue/textile.

By conducting the relative movement of the surface during the entire or at least a bigger part of the duration of separation, a permanent cleaning, and thus, maximum cleaning of the surface of the separating device in terms of time is achieved.

The surface of the separating device which is moved relatively can be covered by the mash or can be immersed in the mash only to a limited extent during the separation procedure.

If the surface of the separating device is covered only partially by the mash, solid particles which accumulate in the region of the level or surface of the mash by reason of the relative movement of the separating device, can be surprisingly easily and effectively "entrained" by the moving surface of the separating device and thus discharged from the mash and finally from the lauter device. It is also surprising that the discharged particles, i.e., the residual mash or a part thereof, are discharged relatively "dry" having a dry substance content of up to 75%. Such dry discharge of the residual mash has not been achieved by the hitherto used separating techniques, in particular lauter tun and mash filter.

The advantage of a high degree of coverage of the surface of the separating device by the mash is a large filtering surface and thus a high flow rate of mash or residual mash and a high volumetric flow rate of obtained liquid phase.

The advantage of a medium to low degree of coverage of the surface of the separating device by the mash is that the space provided for the enrichment and discharge, preferably the "driest" possible discharge, of solid matter from the mash and finally from the device is sufficiently available in the region of the surface of the separating device above the level of the mash. Meanwhile it was found, that is in particular advantageous if the degree of coverage of the surface of the separating device is set to be low on the filtrate side (below 5%, preferably below 2%), in particular, if the wort is discharged without backing up at the separating device.

With regard to the above-described characteristics, a degree of coverage or immersion of the surface of the separating device in the range of 0.1 to 10%, preferably 0.5 to 5%, preferably 0.5 to 3%, in particular 0.5 to 2%, has proven to be particularly advantageous. Thereby, an increased flow rate through the separation device can be ensured. Moreover, a backflow of wort through the separating device in counter flow may be avoided. Consequently, the loss of wort may be decreased and thus, the yield thereof may be increased.

In view of the situation as described above, a degree of coverage or immersion of the surface of the separating device on the feeding side in the range of 0.5 to 30%, preferably 0.5 to 20%, preferably 1 to 10%, in particular 1 to 5%, has proven to be particularly advantageous.

In accordance with the invention, the first, second, third and/or fourth gas-filled space of the first lauter device can contain a gas which contains or consists of air or preferably an inert gas, such as carbon dioxide, nitrogen or helium or mixtures thereof. The use of inert gases can prevent disadvantageous oxidation of the mash or wort.

By selecting the optimum pore size, it is possible, depending upon the composition of the mash, to set the volumetric flow rate of the obtained liquid phase and the properties thereof in an advantageous manner in relation to the material composition thereof. For instance, in the case of a pore size of at least 65 µm, a satisfactory volumetric flow rate of the obtained wort is achieved. If a pore diameter of greater than 350 µm is selected, then, even though a high volumetric flow rate of liquid phase is achieved, coarser particles are possibly no longer adequately separated.

Furthermore, the separating device can be designed as a rotatably mounted separating device or as a rotatably mounted filter. In particular, the axis of rotation of the separating device can form, together the liquid level of a liquid introduced into the receiving unit of the lauter device, a small angle value as described above. By virtue of this arrangement in which the surface of the separating device provided with openings is arranged perpendicularly or approximately perpendicularly with respect to the level of the mash, a high relative velocity of the mash with respect to the surface of the separating device is achieved when the separating device is rotated. As a result, effective cleaning of the surface is achieved.

In the case of the embodiment of the separating device in the form of a disk in which the base surface is formed as a surface which has the openings, or as separating surface, a compact separating device having a high ratio of surface with a separating effect to the entire surface can be achieved.

By selecting the spatial arrangement of the central axis or the axis of rotation of the separating device or its surface preferably approximately in parallel with the level or surface of the mash, wherein deviations from the parallel orientation are certainly possible within specific limits in order to achieve the effects in accordance with the invention, the relative movement of the surface, the partial coverage of the surface or the partial immersion into the mash, an effective cleaning of the surface and high discharge of solid matter can be achieved with a structurally simple lauter device which is easy to handle.

Furthermore, a more or less perpendicular arrangement of the surface with respect to the level of the mash in combination with the merely partial coverage of the surface by the mash and the rotational movement also enables relatively "dry" spent grain particles, to be separated in the region where the surface of the separating device exits from the surface of the mash during the course of the rotational movement. Surprisingly, this allows even a relatively "thick" residual mash or even relatively dry spent grain particles to be discharged from the mash and finally from the separating device.

It is particularly advantageous if the surface of the separating device is movable or can be moved relative to the mash, the residual mash and/or the receiving unit of the lauter device such that a plurality of surface elements, the surface of the separating device which are covered by the mash during separation, exit from the mash during the course of the relative movement and at least intermittently are not covered by the mash, in order to then be immersed into the mash again as the relative movement progresses.

If the mash or a residual mash can flow through the device in accordance with the invention solely as a result of gravity, the design of the device in accordance with the invention is simplified considerably e.g. by the omission of pumps etc.

Moreover, in accordance with the invention the energy consumption for operating the lauter device is reduced by 40% or more compared with a conventional lauter tun. Furthermore, the lower consumption and/or the smaller number of consumers reduces the current consumption peaks of the lauter devices in accordance with the invention. As a result, the required installed power can be reduced. Furthermore, the amount of energy applied to the medium to be separated and therefore, the heating thereof are lower, which has a beneficial effect upon the product. By being able to omit the action of pumping, the approaching flow pressure of the inflowing mash or residual mash is lower, whereby the surface of the separating device is additionally protected against becoming blocked.

The surface of the separating device can have a diverse shape which provides a high level of flexibility in terms of plant design. Preferred contours of the surface, such as e.g. convex, concave, undulating or zigzag-shaped contours can cause additional flow effects or swirling on the surface of the separating device in the vicinity of the surface which moves in the mash or residual mash and moves relative to the mash or residual mash. This further improves the cleaning of the surface.

The provision of protrusions, such as e.g. bars or paddles which protrude from the surface of the separating device and preferably are arranged perpendicularly or substantially perpendicularly or obliquely with respect to the direction of the relative movement of the surface of the separating device, improve the discharge of solid matter from the mash or residual mash and from the lauter device.

The provision of two separating devices for each lauter device, of which the surfaces effective for separation are arranged substantially in parallel with one another and are at a spaced interval of not more than 50 cm, preferably not more than 30 cm from one another, is particularly preferred.

This provides a highly compact device with a large effective separating surface by reason of the presence of two (actively separating) surfaces of the separating devices or separating surfaces. If both surfaces also exhibit the same or approximately the same direction of the relative movement, in particular the same direction of rotation in the space, and the two surfaces of the separating devices are arranged spaced to a sufficiently small extent apart from one another, a particularly effective discharge of solid matter from the mash or residual mash and from the device is achieved, wherein the discharged solid matter have a relatively high dry matter content.

Similar effects are achieved if, in the presence of at least one separating device in the device, the distance from a wall of the lauter device or in particular the receiving unit is sufficiently small, preferably not more than 50 cm, preferably not more than 30 cm.

The lauter device according to the invention is not limited to the manufacturing of wort. Advantageously, it may be used for a plurality of media from the brewery or beverage industry in order to separate solid matter. By doing so, similar advantages are achieved as discussed above in context with the mash separation/manufacturing the wort, respectively.

In accordance with the invention, the control devices can be formed as separate control devices. However, they can also be embodied in one single control device which performs the functions of the first, second, third and/or fourth control device in accordance with the invention.

By connecting several, preferably two to four or more, in particular up to ten, lauter devices in accordance with the invention in series, a multiple-stage separation of solid matter can be achieved. In the case of a system comprising multiple-stage separation, by adjusting the pore sizes of the openings of the surfaces of the individual lauter devices, e.g. pore sizes which become increasingly smaller in downstream direction, it is possible to completely prevent the separating surface from becoming clogged or blocked or at least to delay this for a longer period of time. As a result, the total achievable volumetric flow rate of the medium to be separated is high across the system.

Furthermore, other parameters, such as the degree of coverage or degree of immersion of the surface of the separating device in relation to the mash or residual mash, the shape of the respective separating device and in particular its respective surface and the other parameters which are stated within the scope of this application relating to the lauter device in accordance with the invention, can be adapted individually in every separating device in the cascade-like arrangement to suit the respective technological characteristics and objectives. This increases the overall flexibility of the system in accordance with the invention and its adaptability to suit the medium to be separated or to be obtained.

Between two separating stages in the form of a lauter device in accordance with the invention in each case, a portion of an extraction agent, preferably water or a diluted mash, can be admixed in each case to the respective residual mash. In the subsequent wort obtaining stage, a wort is then obtained in a correspondingly high dilution (post run or post run discharge). The more wort obtaining stages the system comprises, the more extensively the residual mash can be washed. Thereby, the extract yield of the wort manufacturing increases in total.

With regard to a high extraction yield and the avoidance of an undesirably high dilution of the total volume of the resulting wort, it is particularly efficient if the extraction agent is guided in counterflow with respect to the flow of the mash and/or the residual mash. Therefore, e.g. at the end of the series or cascade of lauter devices, water can be used as the extraction agent and the diluted wort obtained in the last stage can be used as the extraction agent etc. in the penultimate stage.

However, a "fresh" extraction agent, that is, an extraction agent free of wort, can alternatively be used in each extraction step (mixing step). In this case, it is advantageous that the washing is more efficient in terms of the decrease of the concentration of wort from separation stage to separation stage than in the case of the counterflow operation described above. As a result, on the whole fewer separating stages are required overall, which reduces the effort on equipment and costs.

The advantages of the lauter device in accordance with the invention apply similarly to the method in accordance with the invention.

The application of the device according to the invention allows setting an increased turbidity and a certain solid particle load, at least referring to the fine particle fraction, in the resulting wort. The worts obtained by the wort manufacturing method according to the invention clearly differ from the worts obtained in a lauter tun, which are desired to be blank, almost clear like water. Thus, according to the invention, there is no extensive depletion of the mash. Instead, with the inventive method, precious components of the mash may be provided, such as long-chain fatty acids (C16 to C18:2), zinc and the particle load, which have a positive effect on the fermentation behaviour and fermentation rate and possibly also on the quality of the beers produced with the worts obtained according to the invention.

By means of the addition of water or a diluted wort to the residual mash of the respective separation step and providing a device to conduct this, which are disposed in a separating device or in particular downstream to a lauter device and upstream to the following lauter device, a desired de-sweeting (dissolving and separating of water-soluble carbohydrates from the respective residual mash) is achieved.

By arranging a barrier element in the flow path downstream to a lauter device in accordance with the invention and upstream to the subsequent lauter device, i.e., in the flow path of the residual mash or the residual mash diluted with the extraction agent between two lauter devices, the suspension is forced to flow over a weir-like obstacle. In this case, solid particle sedimentation can be achieved in the barrier region upstream to the barrier element, thus improving the clarifying effect.

In terms of extensively separating solid matter and efficiently obtaining soluble substances, it is particularly advantageous to combine a barrier element and a unit for supplying water or a diluted wort, which are both arranged in each case between two lauter devices in accordance with the invention.

Further disclosure, alternatives and advantages as regards the second device V2 and the second partial method TV2.

The second device V2 of the brewing plant OM according to the present invention may have a first apparatus for setting the temperature, in particular for cooling, of the wort after completing the step of keeping hot/boiling of the wort, which is suitable to cool the in-flowing, hot wort to the first temperature in counter current or direct current to the cooler wort leaving the clarifying device, in particular the clarifying device KV according to one of the above numbers 60 to 65 or a whirlpool. The latter wort which has the first temperature or a temperature slightly below, is heated to a third temperature which is approximately between 82 and 99° C., preferably between 82 and 95° C., preferably between 82 and 90° C., in particular between 82 and 85° C. Due to this further heating the enzymes are inactivated in a controlled manner. In a wort cooler, arranged further downstream, the wort can then be cooled to the second temperature, for example to a pitching temperature. Thus, according to the invention, also the wort obtained after the clarification step can be advantageously used for pre-cooling of the wort obtained by the keeping hot/boiling step. At the same time, the wort receiving the heat is heated to the third temperature for enzyme inactivation. By doing so or with the structure, the method according to the invention may be implemented in an energy efficient way including a controlled inactivation of the enzymes added. Therein, the heat which is required for the further "inactivation heating" may completely be derived from the hot cast wort.

Therefore, the second partial method TV2 according to the invention and/or the second device V2 according to the invention may be designed such that the wort WO (as heat carrier) being tempered to the first temperature, in particular the pre-cooled wort, may be used to set the temperature, in particular cooling of the warmer wort WO (e.g., cast wort) derived after keeping hot or boiling. Therein, the latter wort WO is set to the first temperature, in particular is cooled, whereas the wort already been precooled earlier, preferably to the third temperature, is heated for enzyme inactivation, before the same is then cooled to the second temperature, e.g., pitching temperature, after a predetermined period of time has elapsed.

With the inventive second device V2 the apparatus for setting the temperature, in particular cooling, of the wort to the first and/or second temperature and/or for heating the wort may be designed as one single heat exchanger or two heat exchangers.

In case the apparatus for setting the temperature, in particular cooling, of the wort according to the invention consisting only of one heat exchanger, the effort for implementing the invention is minimum as regards the apparatus. It is in particular advantageous, if in an existing plant it may be referred back to a wort cooler already existing, when implementing the invention. In case the device for setting the temperature, in particular cooling, of the wort consists of two heat exchangers, the flexibility is higher and the respective heat exchanger may be designed specifically for the job it is supposed to do and may suitably be arranged.

The mash extract described above may be produced for example with the following steps: (aa) during mashing, taking a portion of mash, wherein the mash has a predetermined temperature; (bb) at least partly separating the solid particles from the portion of mash obtained in step (aa), preferably by sedimentation of the same, whereby the mash extract is obtained.

Therein, the malt extract said may also consist of a mixture of mash extracts which have been obtained at different, predetermined temperatures or in different, predetermined temperature ranges of the mash, and at least partly clarified as regards the solid particles, as described above. Therein, the preferred temperature ranges are as follows:

TABLE 4 preferred temperature ranges for obtaining the enzyme-
containing substrate, the enzymes correspondingly
hereto in view of their effect optimum and their effect

| temperature range | optimum for the enzyme activity of | effect/improvement |
|---|---|---|
| approx. 35 to 40° C. | maltase | final degree of attenuation; decomposition of sugars |
| approx. 40 to 45° C. | endo-β-1,4 glucanase | filterability/ viscosity of the beer |
| approx. 50 to 60° C. | endo-β-1,3 glucanase | filterability/ viscosity of the beer |
| approx. 50 to 65° C., in particular 62 to 65° C. | β-glucan solubilase | filterability/ viscosity of the beer |
| approx. 60 to 65° C., in particular 62 to 64° C. | β amylase | final degree of attenuation |
| approx. 65 to 75° C., in particular 72 to 74° C. | α amylase | final degree of attenuation |
| approx. 45 to 50° C. | endopeptidase, carboxypeptidase, aminopeptidase, dipeptidase | protein decomposition; reduced formation of turbidity in the final beverage; gluten degradation for manufacturing of beverages free of gluten |

Based on the temperature ranges as indicated in the previous table also the temperature may be selected for taking the portion of mash.

In the inventive method, setting the temperature, in particular cooling, of the wort is preferably carried out under consideration of the temperature ranges as reproduced in the previous table to the first temperature between 0 and 85° C., preferably between 0 and 80° C., preferably between 70 and 85° C., preferably 30 to 80° C., preferably 40 to 80° C., preferably 40 to 55° C., preferably 45 to 50° C., preferably 50 to 78° C., preferably 60 to 78° C., preferably 70 to 76° C., preferably 73 to 75° C., or in the range of 78 to 85° C., preferably 78 to 84° C., preferably 80 to 85° C., in particular 80 to 83° C. Thus, the temperature ranges as reproduced in the previous table may also be used as the temperature ranges for the first temperature. That is, the first temperature may also be determined on the basis of the temperature ranges as indicated in the previous table when setting the temperature, in particular cooling, of the wort after keeping hot or boiling the same.

With the second partial method TV2 of the method VO according to the invention the portion of the mash, of the mash extract and/or containing an enzyme-containing wort WOE not being heated to more than 80° C., preferably the first wort (first run), added to the tempered, in particular precooled, wort, may originate from the same brew (mash/wort charge). However, the invention is not necessarily limited to this. The portion or portions added to the precooled wort may also originate from another (a previous or later) brew. It is in particular advantageous, if the added portion of an enzyme-rich mash or wort, which for instance originates from all malt mash, is added to a wort according to the invention which originates from raw materials being poor in enzymes, such as adjuncts based worts.

The invention is not necessarily limited to add the portion of the mash, the mash extract, and/or the portion containing an enzyme-containing wort not being heated more than 80° C., preferably the first wort (first run), to a wort tempered, in particular precooled, after keeping hot/boiling the same. Rather, such a portion may also be added to another batch of mash in order to support the enzyme potential, in particular if it is dealt with low-enzyme, for instance adjuncts-based mashs as described above. Therein, as described herein, the at least one portion of the mash, of a mash extract or at least one portion containing an enzyme-containing wort not heated to more than 80° C., preferably a first wort (first run), can be obtained and may be added to a mash to any point of time during mashing or after mashing or may be introduced to the mashing vessel prior to mashing-in. Besides, all further indications, properties and advantages of this modification of the invention derive analog to adding of the at least one portion to the tempered, in particular precooled, wort as described above. Accordingly, the same limitations referring to the method and to the device, as they are described for the addition of the portion(s) to the tempered, in particular precooled, wort in this application, may also be combined with the adding of the portion(s) to a mash of another batch of mash.

Due to the at least partial separation of solid particles from the mash or wort portion still prior to the addition, as is for example the case with the production of the mash extract, the efficiency of the method according to the invention referring to an improvement of the technological properties of the resulting wort is increased according to the knowledge of the inventors. Herein, solid particles in particular relate to particles of malt, malt grind and cereals.

In a preferred embodiment, for example for manufacturing of gluten-free beverages, the worts can be set to a first temperature of no more than 55° C. (for example 40 to 55° C., in particular 45 to 50° C.) in step (2a). Here, it is advantageous, if the temperature of the enzyme-containing substrate added in step (2b) reaches a temperature of not more than 55° C., if a maximum of enzyme activity of the respective peptidases is to be achieved.

However, it is also possible and according to the invention, if the first temperature T1 to which the wort is set to, and/or the temperature, which the enzyme-containing substrate at least temporarily reaches until the addition according to step (2b), is slightly above (e.g., +2 to +10° C.) the enzyme optimum temperature of, for instance, 55° C. Despite the upcoming, temperature-caused enzyme inactivation, still a sufficient degradation of gluten or other target molecules may be achieved, which is assumed to be because of the accelerated turnover due to the increased temperature. In order to achieve defined completion of the enzyme activity with this method, after adding of the enzyme-containing substrate and allowing a predetermined period of time to lapse, the wort may be heated to a third temperature of for example, 85° C.

In contrast, if in step (2a) of the second partial method TV2, the wort WO is set to a first temperature in the range of 80 to 85° C. or at least to a temperature above the usual operation range of the respective enzyme (not higher than a temperature of the maximum substrate turnover per unit time, that is, the temperature optimum or efficiency optimum), the efficiency optimum may be exceeded. However, the inventors have found a high enzyme activity still sufficient to ensure an enzymatic degradation which is sufficient in terms of quantity, before the enzyme activity stops due to the proceeding enzyme inactivation due to the heat.

In step (2a) of the second partial method TV2, there is therefore an option to set the temperature of the wort to a temperature of 2 to 20° C., preferably 5 to 15° C., above the temperature optimum of an enzyme relevant for the substrate degeneration, as is indicated for example in the table above. It is a special advantage of this way of proceeding, that an aimed inactivation of the respective enzyme or of the respective enzymes is achieved more or less at the same time or after the degradation, without the need of heating the wort again in order to achieve an aimed inactivation. By doing so, the method is simplified, and a further heating of the wort can be omitted. Additionally, with this procedure the heat flow to be transferred between the media applied, such as the wort WO and a heat carrier or coolant, compared to a further cooling of the wort to, or in particular below the temperature optimum of the respective enzyme is reduced, thereby simplifying the handling of the method. Moreover, a lower complexity of the method for recuperation of heat from the wort WO previously heat treated and of the device applied to carry out the same, results.

Moreover, according to the invention, at least one portion of an enzyme-containing substrate, preferably of the mash, of the mash extract or of the enzyme-containing wort, not being heated to more than 80° C., in particular a portion of a first wort (first run), is added to the wort which has been set to the first temperature in this way, and which is in particular precooled. By doing so, the enzymes, naturally contained in the added substrate, may work in the wort which has already been heat-treated and which is thus, inactivated in terms of the enzymes, in order to further improve and preferably complete the degeneration of high molecular substances, such as starch. Moreover, the assumed effects of a fine and finest turbidity which has been transferred to wort during lautering which may be problematic in the further method of the beer and beverage manufacturing, are avoided, at least partly. Moreover, the disadvantages of a malt which has not been sufficiently solubilized may advantageously be compensated at least up to a certain degree.

Preferably, the volume of the portion of the enzymatic substrate, e.g., a first wort (first run), is approx. 0.5 to 4%, preferably 1 to 2%, of the total volume of the wort WO to which the enzymatic substrate is added to.

By allowing a predetermined period of time (step (2f)) to lapse, it is ensured that sufficient time is available for the enzymatic turn over. Therein, the composition of the starting material wort WO as well as the respective enzyme in the enzymatic substrate and further boundary conditions, e.g., the temperature of the wort WO, determine the effective impact duration which is at least required and the optimum impact duration. Because of the additional heating step, the activity of the enzymes added by the addition may be stopped or at least reduced in a defined way by thermal inactivation. By doing so, the control of the enzymatic activities may be further improved. Therein, the heating is carried out preferably after clarifying the wort. Herein, the time during clarifying, e.g., in the whirlpool, may be used advantageously for the impact of the enzymes. Maintaining the increased third temperature of the wort is required only as long as the respective type of enzyme has been inactivated completely or to a sufficient extent.

As an impact duration for the enzymes or the predetermined period of time a period of up to 60 min, preferably 3 to 30 min, in particular 5 to 25 min, may be selected. On the one hand, such an impact duration ensures a substantially complete enzymatic turn over or its completion, on the other hand, the potential thermal load of the wort is reduced by the limitation of the period.

The intermediate storage allows to apply the enzymatic portion of the mash, of the mash extract and/or of the wort/first wort (first run) for the treatment of a wort at any point of time later on, for example, prior to, during and/or after the whirlpool step or of another separation step. By doing so, the flexibility in terms of time increases when applying the inventive method. If the intermediate storage is carried out in e.g., only one storage container, it is additionally possible, to manufacture a mixture of different mash and/or wort/first wort (first run) portions in a simple and cost effective manner and to store the same for the later application. When providing a plurality of storage containers, the flexibility of the handling is advantageously further improved.

Setting the temperature, in particular cooling, of the wort to the first temperature and/or cooling the wort to the second temperature and/or heating the wort to the third temperature may be carried out in the same heat exchanger.

By carrying out all or at least all cooling and maybe heating steps in the very same heat exchanger, the effort in terms of the apparatus in the implementation of the inventive method and thus, the plant investment required is minimized.

Further disclosure, alternatives and advantages with respect to the isomerisation device IV and the third partial method TV3.

When additionally providing a separate isomerisation device IV for isomerizing of isomerizable hop components or the third partial method TV3 and the specific embodiments as explained above, the following advantages result:

According to the invention, the temperature of the mixture IG of the hop substrate IH and of the isomerisation substrate IS is maintained below a maximum temperature TMAX attained by the wort WO during the thermal treatment of the same in a beer manufacturing method. The latter usually is the keeping-hot or the boiling temperature of the wort. Because of the temperature being reduced compared to conventional wort and hop treatment and in particular, compared to known high temperature rapid isomerisation methods (with T=approx. 120° C.), the isomerisation according to the invention is carried out is smoother and the thermal load is smaller, which results e.g., in a lower increase of the thiobarbituric acid number TBN. This also means a smoother treatment of the hop aroma, which positively contributes to the quality of the resulting isomerate.

Moreover, the energy consumption of the suggested method is lower due to the temperature being lowered during the isomerisation.

In context with the presence of a load of particles which are coarser than in conventionally produced worts (e.g., worts obtained from lauter tuns), the inventors found in the worts manufactured by means of the lauter device according to the invention, that in the presence of these particles, the yield of isomerisation of the hop components increases.

The isomerisation substrate IS preferably has a volume in the range of 25 to 45%, preferably 30 to 40%, of the kettle-full wort of the respective brew. The residue amount of wort is exposed to the thermal treatment.

The isomerisation speed which is lower due to the lowered temperature is compensated in the inventive method by a isomerisation period tI which extended by at least 20 minutes compared to the conventional thermal treatment, so that no deficiencies have to be accepted in terms of isomerisation degree or isomerisation yield. While the period of isomerisation with the conventional wort boiling is substantially limited to the period of boiling, according to the invention, an extension of the period of isomerisation is achieved due to the separate treatment of the hop substrate IH or of the mixture IG, independently of the heat treatment of the wort batch. Therefore, the period of isomerisation tI may be set completely independent of the thermal treatment of the wort WO. Thus, according to the invention, besides the period of boiling for example also the period of the hot trub separation during the whirlpool step may be utilized, to parallel carry out the hop isomerisation and to hereby increase the yield of isomerized hop components. In other worts, by means of the suggested method, it is possible to achieve an optimum yield of isomerized hop components, such as a acids, without the need to increase the temperature during isomerisation to the temperature usual during the thermal treatment of the wort WO or even higher.

Moreover, it is advantageous to avoid falling below the lower limit temperature of the temperature range as defined in the claim when carrying out the isomcrisation. By doing so it is ensured that the isomerisation reaction takes place in an acceptable period of time until the desired degree of isomerisation is reached. Lowering of the isomerisation temperature below the lower limit value would cause a strong deceleration of the isomerisation reaction, such that the desired degree of isomerisation may possibly not be achieved within the predetermined period of time.

Since according to the invention, the concentration of the applied isomerisation substrate IS is low due to the low content of extract and additionally, the solid matter content is smaller compared e.g., to the first wort (first run) or the first wort WO1 of the same brew, the loss of precious hop components is lowered. Further, the losses of precious components which remain in the hop trub are lower. Besides, due to the lower amount of hop trub, also a lower loss of wort remaining in the hop trub is achieved, which finally results in an increased extract yield achieved with the brewing method.

In contrast, it may be advantageous according to an observation of the inventors, if the isomerisation substrate IS applied has a portion of coarse particles, in particular, in case also fine particles are present in the isomerisation substrate IS. Herein, coarse articles mean particles having a particle size between 40 and 400 µm, preferably 40 to 300 µm, in particular 40 to 200 µm. Herein, fine particle mean particles having a particle size of smaller that 40 µm, preferably from I µm to smaller than 40 µm. Therein, the particle size measurement is carried out according to the method as described in the appendix.

The concentration of the coarse particles as defined above in the isomerisation substrate IS may be higher than 100 mg/L, preferably higher than 200 mg/L; in particular higher than 400 mg/L. If the coarse particles are present in the isomerisation substrate IS in an amount of higher than 100 mg/L, preferably higher than 200 mg/L, in particular higher than 400 mg/L, a further increase of the isomerisation yield of the hop components, in particular of the a acids, was observed. Presumably, the coarse particles have in contrast to the fine particles due to their lower specific surface a lower affinity to other substances, so that they tend to bind the hop components less. It is further possible that the coarse particles absorb the fine particles contained in the isomerisation substrate IS, so that the fine particles may conduct their adsorbing effect on the hop components not any more or only to a lower extend.

The combination of a lower concentration of the applied isomerisation substrate IS compared to conventional methods and the lowered isomerisation temperature has a positive effect on the quality of the resulting isomerate, since the thermal load is lower.

It is in particular advantageous, if a post run or last run or last wort derived from the conventional beer manufacturing method is used as the isomerisation substrate IS, since these substrates have a low extract content as well as a low solid matter content or a low particle load, compared, e.g., to the first wort (first run) or the first wort WO1 of the same brew, which leads to lower losses of isomerized hop components. Moreover, the thermal load is smaller since a lower amount of organic load is present in the isomerisation substrate IS. In addition, the pH value of these substrates is relatively high which also support the isomerisation.

Due to the option of the evaporation or due to providing an outlet vent ID it is possible to advantageous remove unwanted hop components in the mixture IG, such as myrcene. Due to the reduced evaporation of hop components during the step (3d) compared to the conventional wort boiling, a selective evaporation of unwanted hop components is made possible in a subsequent step.

If the mixture according to step (3f) comes in contact with the wort WO only after the separation of at least part of the solid matter of the wort WO, for example, when the addition of the mixture IG to the wort WO is carried out only after the whirlpool step, the isomerized hop components come in contact only with the boiled wort WO from which solid matter has already been removed. By doing so, the losses of iso a acids due to absorption to hot trub or other particles are minimized.

In step (3d) of the third partial method according to the invention, the temperature of the mixture IG may also be set to a temperature within one of the following temperature ranges TB:

15° below to 2° C. below,
preferably 10° C. below to 2° C. below;
preferably 12° C. below to 3° C. below;
preferably 8° C. below to 2° C. below;
preferably 10° C. below to 3° C. below;
preferably 15° C. below to 5° C. below;
preferably 10° C. below to 4° C. below;
preferably 8° C. below to 3° C. below;
preferably 7° C. below to 3° C. below,
of the maximum temperature TMAX attained by the wort WO during the thermal treatment of the same in the beer manufacturing method.

Alternatively, the temperature range TB may include also one of the following ranges: 85 to 98° C.; 85 to 97° C.; 85 to 96° C.; 85 to 95° C.; 88 to 98° C.; 88 to 95° C.; 88 to 94° C.; 90 to 98° C.; 90 to 97° C.; 90 to 96° C.; 90 to 95° C.; and 92 to 97° C.

Further disclosure, alternatives and advantages with respect to the clarification device KV and the fourth partial method TV4.

By means of cooling the wort in the upper area of the container KVB the clarification of the wort is accelerated. The trub particles sediment significantly earlier, so that the duration of clarification may advantageous be shortened. Moreover, the resulting sediment is more compact and tighter, whereby in total a faster and better solid matter separation results. The same is true when cooling is carried out in the lower area of the container KVB.

If the container is designed as a conus or a cylindrico-conus, an optimum geometry for the solid matter separation may be achieved by setting the angle of aperture to a predetermined range of angles.

By allowing the wort to flow in in tangential or substantially tangential direction relative to the wall of the container KVB, the wort body comes into a rotational movement, whereby the solid matter sedimentation is accelerated.

Due to providing one or more outlet openings in different heights the withdrawal of the wort may be started very quickly from the top where the partial volume of the wort is which clarifies fastest. The withdrawal may be continued step by step in downward direction. In total, by doing so a time-saving and a lower thermal load of the wort during clarification results, since the withdrawal may earlier be started and may faster be completed.

According to the invention, cooling may be limited to only the upper or the lower half or only the upper or the lower third of the container KVB. A limitation of the cooling to the areas mentioned has proved to be advantageous with respect to a fast and complete separation of the solid particles in comparison to a complete cooling or to no cooling of the container KVB.

Further disclosure, alternatives and advantages of the fifth partial method TV5.

In the course of the investigations, the inventors further have come to the conclusion that by mixing of the turbid wort WO obtained by means of a surface filtration being the lautering method with a specific additive, which contains certain solid matter, the solid matter load causing the fine turbidity may finally be reduced (that is, after another solid matter separation).

The wort WO which is relevant here and which is obtained from the first partial method TV1 often has a content of solid matter of at least 300 mg/L, often at least 1,000 mg/L, or even at least 2,000 mg/L. Surprisingly, the presence of the additive in the turbid wort in any way seems to cause a binding or agglomeration of the particles causing the fine or finest turbidity, so that an unexpected clarification effect as regards the fine turbidity can be achieved. The inventors at least assume this in their working hypothesis wherein no reliable published research results are available to date.

It is an additional new finding, that due to the mixing with the additive the yield of hop components, such as isomerized a acids, may be increased with a subsequent hopping of the wort or of the mixture of wort and additive, in particular, if the solid matter, that is the fine particles bound to additive, are removed at least partly prior to hopping.

The partial homogenization of the mixture and in particular, complete homogenization or homogenization to a great extent allows an intensive contact of the particles of the turbidity with the solid matter of the additive. Thereby, a clarification or separation of the solid matter load in the wort is accelerated as described above.

In case the additive is added still prior to the thermal treatment to the wort, in particular, prior to the wort boiling, and if a thermal treatment is conducted, a further increase of the separation of the finely dispersed solid matter particles from the wort is achieved. The reason for this is probably, that the solid matter particles which have been added to the wort and the proteinaceous agglomerates precipitating in form of the hot trub during keeping hot or boiling of the wort complement each other in the clarifying effect, so that the remaining fine turbidity of the wort or of the mixture may further be lowered.

A further finding which was not foreseeable is, that the latest addition of the hop substrate to the wort treated as described above causes an increased yield of precious hop components, for example isomerized a acids, in the wort or in the mixture treated according to the invention.

Therein, the addition of the hop substrate may be conducted preferably 5 to 15 minutes prior to the completion of the thermal treatment according to step (5d). However, it is also possible to conduct the addition at the end or after the completion of the thermal treatment. In these cases, at the point of time of the hop addition the depletion of the turbidity particles is already advanced. Moreover, there is still a sufficient amount of thermal energy available and the isomerization time is sufficiently long in order to achieve a high yield of isomerized hop components. It is in particular advantageous, if the hop addition is carried out after the at least partly separation of the solid matter contained in the wort WO containing the additive Z or in the additive mixture ZG, thereby reducing the loss of hop components, in particular of isomerized hop components. After obtaining the wort WO containing the additive Z or after the thermal treatment of the wort WO containing the additive Z, in particular prior to the hop addition, the solid matter contained in the wort WO may advantageously be separated in such a way, that the resulting wort WO has a content of solid matter of not more than 100 mg/L, preferably not more than 70 mg/L.

It is assumed, that the solid matter which originates from the additive, at least partly bind the turbid particles or cause a sedimentation thereof by means of the contact with the wort. Consequently, by partly or completely separating the solid matter of the wort WO it is ensured that also a substantial part of the turbidity particles from the wort or from the mixture are removed, before the hop product is added. Due to the presence of a lower solid matter amount in the wort, a further increase of the yield of the isomerized hop components is achieved. Most probably, the reason for this are the lower losses as regards the absorption of hop components to the solid matter particles.

The subject matter previously described and according to the invention, the brewing plant, the devices and the method for obtaining and/or treatment of a wort in the beer brewery and in the beverage industry and corresponding uses and applications are suitable to produce and/or treat worts from mashs, wherein the mashs have been produced by use of a conventional malt grind and/or adjunct grind suitable to be applied to a lauter tun, in particular, of a grind which was produced by a four or six roller mill.

Surprisingly, the inventive subject matter are also suitable to obtain and/or to treat a wort from a mash or from another media, which was produced from a malt grind and/or adjunct grind suitable to be applied to a mash filter, in particular, of a grind which was produced by a hammer mill.

Moreover, the inventive subject matter are also suitable to treat a mash or another media, in particular to obtain and/or to treat a wort from a mash, wherein the mash or the media was produced from one or more malted or unmalted raw materials, selected from the group of raw materials suitable for the production of beer or other beverages.

Therein, the inventive subject matter show a high flexibility unknown so far as regards the raw materials to be applicable and the pre-treatment, in particular milling, of the same. With all raw materials which are applicable and with all pre-treatments a high extract yield is achieved.

It is explicitly part of the invention, that the previously described brewing plant, devices and partial devices of the same, methods, partial methods, and uses for obtaining a wort from a mash or for treating of the wort, may be combined with each other, respectively. In particular, also all features of the advantageous embodiments as disclosed in this application may be combined with any subject matter according to the invention and as disclosed or claimed.

It is in particular a part of the invention, that all previously described devices for obtaining and/or treating of wort, in particular the respective, separately described (partial) devices described above, which may be part of a brewing plant, or all methods according to the invention for obtaining and/or treating of wort, in particular the partial methods as described above, are disclosed single/separately, respectively, or in any combination with each other in this application.

All devices according to the invention and the brewing plant based thereon may be operated discontinuously in the batch method. However, it is in particular advantageous if the devices according to the invention and the brewing plant based thereon are operated continuously. Accordingly, the methods and partial methods according to the invention and described in this application may be conducted discontinuously, that is batch wise, and in particular advantageous, may be conducted continuously. In case the method according to the invention consists of a plurality of steps, all steps may be carried out continuously, respectively, and thus, the entire method may be carried out continuously. However, alternatively, all steps may be carried our discontinuously, respectively, and thus, the entire method may be carried out discontinuously. However, the invention is not limited hereto. Accordingly, it is also part of the invention that within the method according to the invention continuous and discontinuous method steps may arbitrarily be combined with each other. The corresponding is valid for the design of the brewing plant according to the invention and for the uses according to the invention.

It is in particular advantageous, if the lauter device LV has a first lauter device LV1, a second lauter device LV2, a third lauter device LV3, and a fourth lauter device LV4, which are arranged serially. Therein, it is advantageous if the first wort WO1, which was produced by the first lauter device LV1, and the second wort WO2, which was produced by the second lauter device LV2, are exposed to the thermal treatment and the further steps of the wort treatment, such as clarification and cooling, as a mixture (=wort WO). Advantageously, a part of the first wort WO1 is used in the second partial method as the enzyme containing substrate ES, since the first wort WO being a first wort (first run) has a relatively high concentration of enzymes.

In contrast, a mixture made from the third wort WO3, which was produced by the third lauter device LV3, and of the fourth wort WO4, which was produced by the fourth lauter device LV4, or the fourth wort WO4 is preferably used as the isomerisation substrate IS when carrying out the third partial method TV3. Because of the lower particle load and the higher pH values of these wort fractions, the yield of isomerisation of the hop components in the third partial method TV3 is increased.

Alternatively, or in addition to the embodiments of the invention as previously described, the apparatus WH for clarifying the wort WO or to at least partly clarifying the wort WO may be formed of at least one device, which is identical or identical in construction with the first lauter device LV1 as described in this application or with a modification thereof as described in this application. The apparatus WH for clarifying the wort WO may therein be one or a plurality of devices as of the type of the first lauter device LV1. In case a plurality of devices WH is applied, all applied devices WH may be the same. However, also differently designed first lauter devices LV1 may be applied. Moreover, the devices WH may be arranged serially and/or in parallel. For the apparatus WH for clarifying the wort WO the same options for modification and combination apply as for the first and the further lauter devices LV1, LV2, . . . according to the invention. It is in particular according to the invention to replace for example a conventionally used whirlpool or a decanter or a sedimentation tub or a sedimentation tank by an apparatus WH as described in this paragraph. As regards the options of arrangement of the apparatus WH as described in this paragraph within the brewing plant OM according to the invention and the use of the same in the method VO according to the invention, what is, generally described above for the apparatus WH in this application is valid, too.

Exemplary embodiments of the invention are subject matter of the drawing. Thus, it is shown:

FIG. 1 a schematic view of a first embodiment of the brewing plant OM according to the invention;

FIG. 2 a schematic view of a second embodiment of the brewing plant OM according to the invention;

FIG. 3 a schematic view of a third embodiment of the brewing plant OM according to the invention; and FIG. 4 a schematic view of a fourth embodiment of the brewing plant OM according to the invention.

Figure 1:
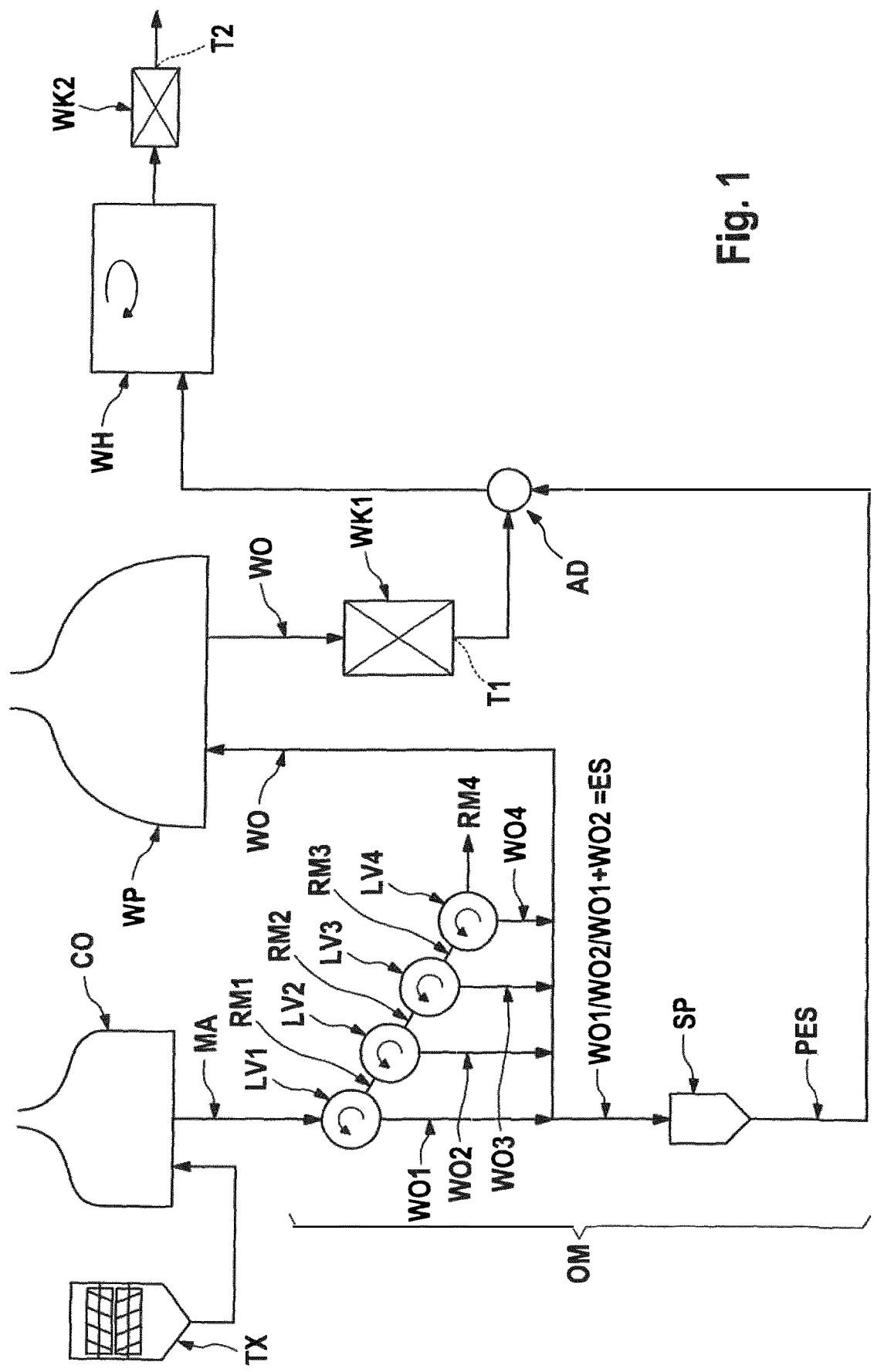

FIG. 1 shows a first embodiment of the brewing plant OM for obtaining and treating of a wort in the beer brewery or in the beverage industry. The brewing plant OM according to this embodiment has a lauter device LV, consisting of a first lauter device LV1, a second lauter device LV2, a third lauter device LV3, and a fourth lauter device LV4, which are arranged serially. However, the invention is not limited to this, but may contain only one or 2 or 3 or more lauter devices. If two or more lauter devices are provided, they can be combined or arranged in parallel, serially or in parallel and serially with respect to the flow path of the mash or wort. The lauter device LV is arranged downstream to a mill TX and a mash device CO, both of which are not part of the brewing plant OM, but may be part of the brewing plant OM. Moreover, the lauter device LV is arranged upstream to a device WP for keeping hot or boiling the wort WO, which is also not part of the brewing plant OM, but may be.

The brewing plant OM according to this embodiment further has a second device V2. The second device V2 has a first device WK1 for setting the temperature of the wort WO to a first temperature T1 between 0 and 85° C. The first device WK1 is arranged downstream to the device WP for keeping hot or boiling of the wort WO. Moreover, the second device V2 has a device AD for adding at least one portion PES of an enzyme-containing substrate ES. The device AD is arranged downstream to the first device WK1.

The brewing plant OM may have an apparatus WH for at least partly clarifying the wort WO, preferably a whirlpool or a decanter or a sedimentation tub or a sedimentation tank. The clarification apparatus WH is arranged preferably downstream to the device AD and upstream to a second device WK2 for cooling of the wort WO treated in the apparatus WH to a second temperature T2, preferably the pitching temperature.

Moreover, the brewing plant OM may have a device SP for withdrawing and/or storing of the at least one portion PES of an enzyme-containing substrate ES.

According to the invention, the mash can be produced with any arbitrary method. This includes a broad variation of the raw materials including adjuncts and malts having a low solubilisation. With respect to the process engineering all conventional mash methods including short mash method and/or mash methods being characterized by a low final mash temperature of 65° C. or below may be applied according to the invention. According to the invention, the mash separation is carried out in the lauter device LV which is implemented as the first to the fourth lauter device LV1, LV2, LV3, LV4 in this embodiment. A rotational movement of the respective separating device of each of the lauter devices LV1, LV2, LV3, LV4 is indicated in the figure. A detailed description of possible designs of the respective lauter devices as well as the serial arrangement of four of these lauter devices is described for example, in the German patent application DE 10 2014 116 308, published as DE 10 2014 116 308 A1 (cf. pages 4 to 22 and 56 to 67 of the application and the FIG. 1 to 4 and pages 75 to 77 of the application), which is incorporated hereby in its entirety.

The mash is separated in the first lauter device LV1 into a first wort WO1 and a first residual mash RM1. To the latter, an extracting agent, preferably water or a diluted wort, is added to result in a first mixture MX1 which is transferred to the second lauter device LV2, where the first mixture MX1 is separated into a second wort WO2 and a second residual mash RM2. To the second residual mash RM2 an extracting agent, preferably water or a diluted wort, is added to result in a second mixture MX2 which is transferred to the third lauter device LV3, where it is separated into a third wort WO3 and a third residual mash RM3. To the third residual mash RM3 an extracting agent, preferably water or a diluted wort, is added to result in a third mixture MX3 which is transferred to the fourth lauter device LV4, where it is separated into a fourth wort WO4 and a fourth residual mash RM4. The fourth residual mash RM4 is abolished as spending grains or is made use of in another way. The addition of the extracting agent to the respective residual mash RM1, RM2, RM3, for example between two or within one of the lauter devices LV1, LV2, LV3, LV4 is omitted in the figure for the sake of clarity.

The extract contents and the turbidities of the first to the fourth wort WO1, WO2, WO3, WO4 decrease in the order WO1, WO2, WO3, WO4, wherein the first wort WO1 refers to a first wort (first run), the second wort WO2 and maybe also the third wort WO3 refer(s) to a post run, and the fourth wort WO4 refer to a last run. In contrast, the pH values of the worts increase in this order. Namely, in a trial, the first wort WO1 had an extract content of 13.4° P and a pH value of 5.9, the second wort WO2 had an extract content of 3.6° P and a pH value of 6.7, the third wort WO3 had an extract content of 1.1° P and a pH value of 7.2, and the fourth wort WO4 had an extract content of 0.6° P and a pH value of 7.5.

Within this embodiment, a partial volume of the first wort WO1 and of the second wort WO2 or a mixture of the same is withdrawn and is used as a portion PES of the enzyme-containing substrate ES, as described herein below. This portion PES for example, makes 2.5 percent by volume of the kettle-full volume of the wort WO of this brew. When doing so, it is ensured that the temperature of the portion PES and of the first wort WO1 and/or of the second wort WO2, from which the portion PES is obtained, does not exceed preferably 76° C., in order not to inactivate or substantially not to inactivate the enzymes contained therein. The portion PES is withdrawn by the device SP and stored therein.

The residual first to fourth worts WO1, WO2, WO3, WO4 are exposed as a mixture (=wort WO) to a thermal treatment, preferably keeping or boiling, in the device WP. During this treatment, which may relate to the conventional wort boiling, additionally, the wort WO can be hopped according to any known method. The cast wort WO resulting after completion of the thermal treatment is cooled to a first temperature TK1 between 0 and 85° C., for example, 74° C., in the first device WK1. Therein, the first temperature T1 is set such that the activity of at least one enzyme is still maintained, depending on the effect to be achieved. By means of the device AD the previously obtained portion PES of the enzyme containing substrate ES is added to the wort WO which had been cooled as described above in a volume portion of approximately 2 to 2.5%. Since the temperature of the wort WO to which the enzyme containing substrate ES was added, is in a temperature optimum range of at least one enzyme, this enzyme may continue its activity in the following clarifications step, that is, when separating hot trub in the whirlpool, so that the time of the whirlpool step may be used for the enzyme activity in an advantageous way. To do so, the wort WO is supplied to the clarification apparatus WH, which may be designed as a conventional whirlpool, and the hot trub may is separated to a great extent.

After withdrawing the wort WO from the clarification apparatus WH the wort is cooled to the second temperature T2, preferably to the pitching temperature at 8° C., by means of the second device WK2, and is then further processed to beer in a conventional manner. This includes the steps of the aeration of the wort WO, yeast pitching and fermentation of the wort WO.

Figure 2:
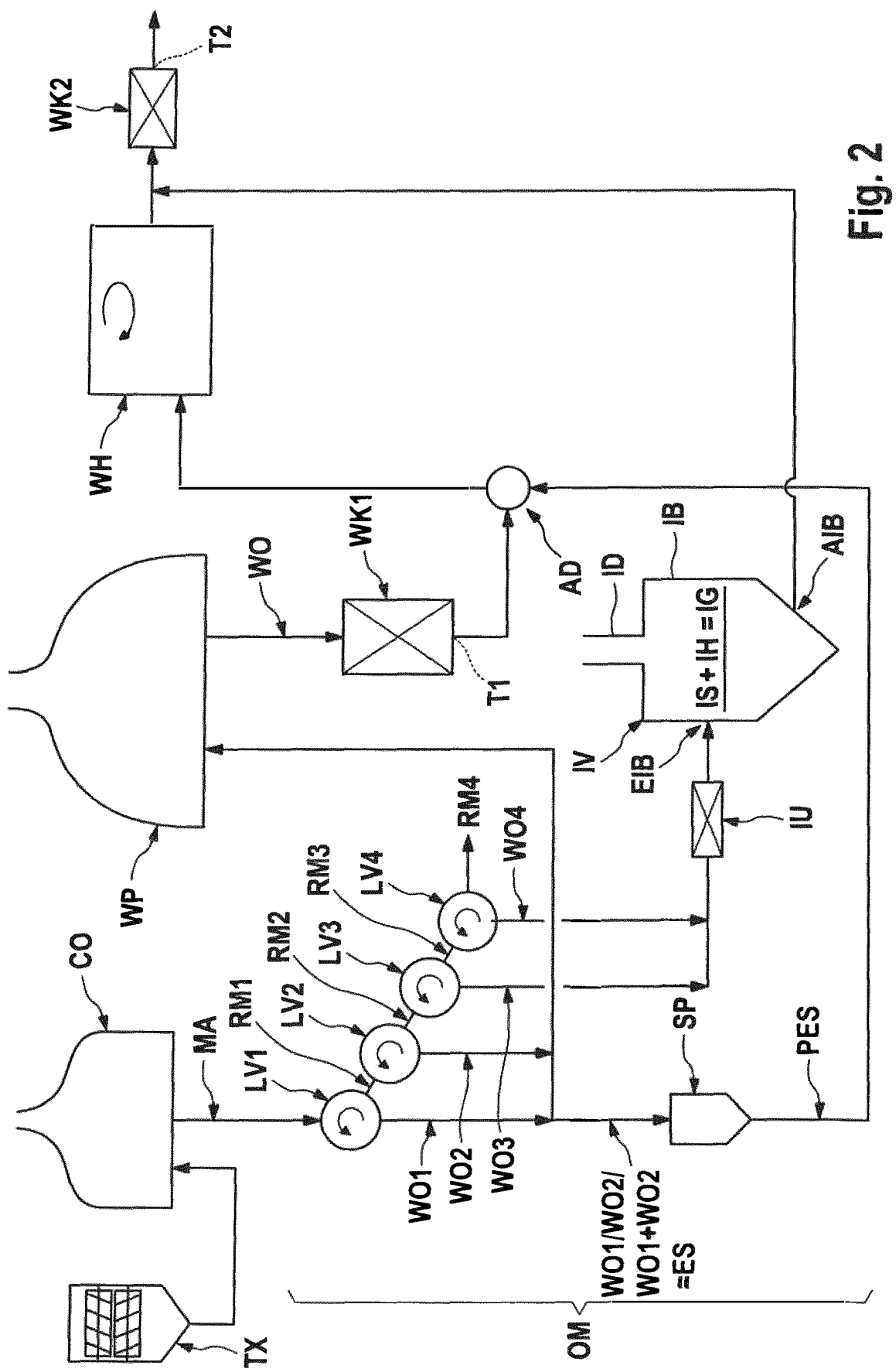

FIG. 2 shows a second embodiment of the brewing plant OM according to the invention. The brewing plant OM and the method according to this embodiment are based on the same principle as the first embodiment, so that herein below only differences to the first embodiment as described above are discussed.

Thus, the brewing plant OM according to this embodiment additionally has an isomerization device IV for isomerizing of isomerizable hop components in an isomerization substrate IS. The isomerization device IV includes a container IB which preferably has the shape of a cylindro-conus. The inlet opening EIB of the container IB is in connection with the lauter device LV, in particular with the third lauter device LV3 and/or the fourth lauter device LV4. In context with the isomerization device IV a heat exchanger IU may advantageously be provided which is suitable to temper, preferably to heat, the isomerization substrate IS or the mixture IG while it is contained in the container IB or on the way to the container IB. In this embodiment, the heat exchanger IU is arranged in the pipe between the lauter device LV, more precisely between the third lauter device LV3 and/or the fourth quarter device LV4, and the container IB.

With the third partial method TV3 according to the invention, the third wort WO3 or the fourth wort WO4 or a mixture of the same is introduced as the isomerization substrate IS while being heated to a temperature of approximately 96° C. to the inlet opening EIB into the container IB. The third wort WO3 and in particular, the fourth wort WO4 are characterized by a lower extract and solid matter content (for example, less than 8° P, less than 800 mg/L) compared to the first and the second wort WO1, WO2. The isomerization substrate IS tempered in this way has volume of approximately 30% of the kettle-full volume of the wort WO of the same brew, and is mixed with a hop substrate IH, for instance natural hops, hop pellets or hop extract, in a desired amount wherein a mixture IG is obtained. Preferably, the mixture IG is homogenized and the temperature, if required, is set to a temperature between 85 and 98° C., preferably 93 to 97° C., if the maximum temperature TMAX of the thermal treatment of the main batch of the wort WO is 100° C. The mixture IG is maintained at a temperature within the range mentioned before for a predetermined period of time tI, in which a thermal turnover of the hop components, in particular the isomerization of the a acids, takes place and is completed to a great extent. Since the thermal treatment of the mixture IG takes place separately and in parallel to the thermal treatment of the main batch of the wort WO, the period of time tI may optimally be selected, e.g., may be set depending on the progress of the isomerization. For example, with a boiling time of the wort of 60 Minutes, the period of time tI for the isomerization of the mixture IG may be selected to be for example, 80 to 100 minutes.

After this thermal treatment of the mixture IG preferably the solid matter thereof is removed, for example by sedimentation, and the clarified mixture IG is added to the wort WO downstream to the clarification apparatus WH and upstream to the second device WK2, for example, a plate heat exchanger.

Figure 3:
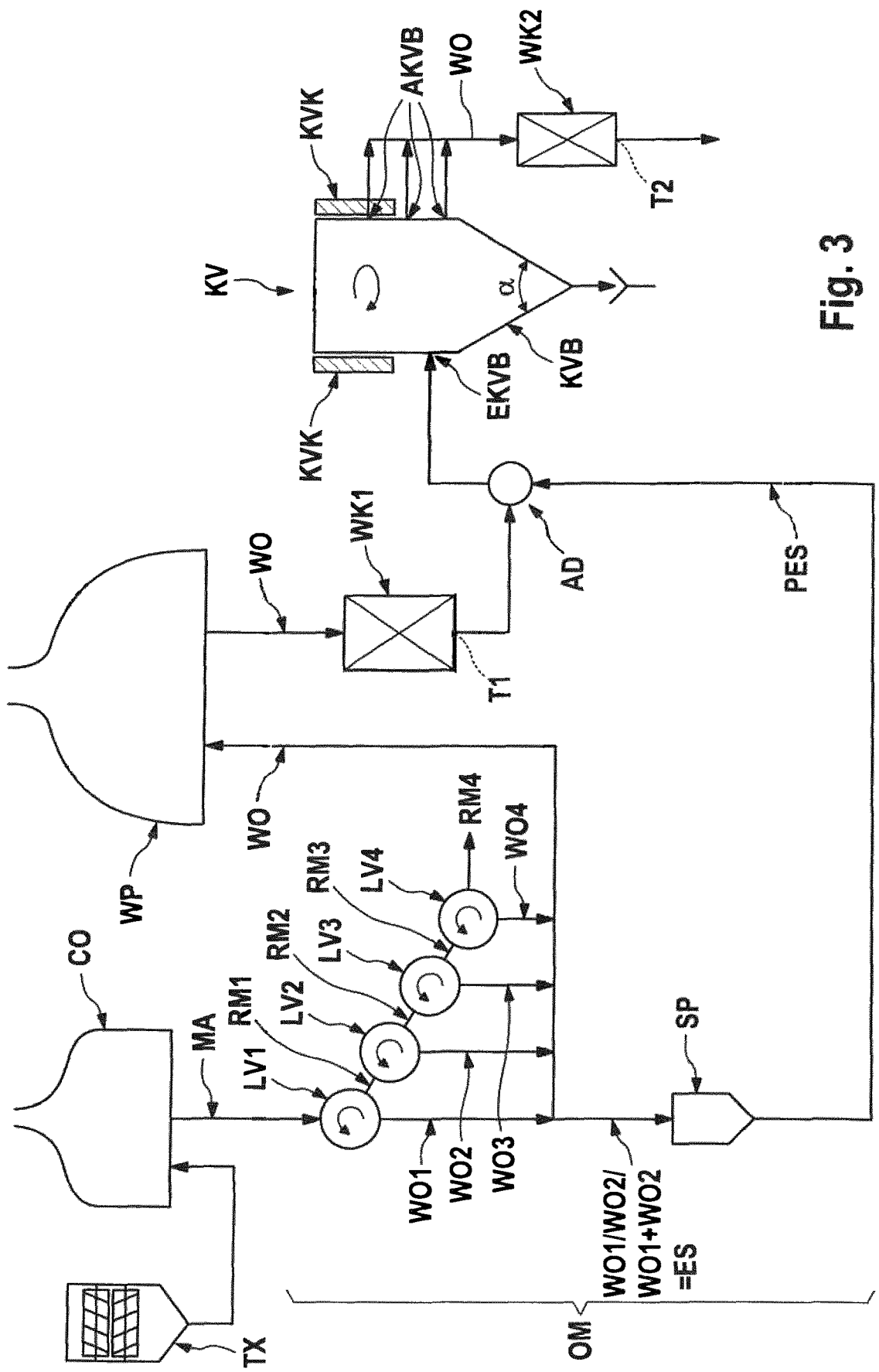

FIG. 3 shows a third embodiment of the brewing plant OM according to the invention. The brewing plant OM and the method according to this embodiment are based on the same principle as the first embodiment, so that herein below only differences to the first embodiment as described above are discussed.

Thus, the brewing plant OM according to this embodiment, further comprises a clarification device KV for at least partially separating solid matter from the wort WO. The clarification device KV has a container KVB for receiving the wort WO, wherein the container KVB is arranged with respect to the flow of the wort WO preferably downstream to the apparatus WP for thermal treating of the wort WO and downstream to the apparatus AD for adding the portion PES of the enzyme-containing substrate ES, and upstream to the second apparatus WK2 for cooling the wort WO. In contrast to the conventional whirlpool, the clarification device KV has a cooling apparatus KVK, which is arranged such in the brewing plant OM, to cool the wort WO which is present in the upper half of the container KVB, preferably in the upper third of the container KVB, or a partial volume thereof. The cooling apparatus KVK may be formed as a wall cooling of the container KVB, preferably as a jacket cooling or side wall cooling, in the upper half of the container KVB. In this embodiment the container KVB has the shape of a conical cylinder (cylindro-conus) having an opening angle (a) of the cone of approximately 60°.

Within the fourth partial method TV4 according to the invention, the wort W to be clarified is introduced into the container KVB for receiving the wort WO through at least one inlet opening EKVB, after completion of the thermal treatment of the main batch of the wort WO and the addition of the portion PES of the enzyme-containing substrate ES to the thermally treated wort WO. Therein, the temperature of the wort WO is for example, approximately 74° C. Preferably, the wort WO is allowed to tangentially flow into the container KVB, in order to cause a rotational movement of the wort body in order to improve the solid matter separation. While allowing the wort WO in the container KVB for a predetermined, average retention time tS at least a partial volume of the wort which is in the area of the upper half of the container KVB is cooled to a temperature which is by at least 10° C. lower than that of the wort WO flowing into the container KVB, by means of jacket cooling. While doing this, at least a part of the solid matter of the wort WO sediments rapidly, and thus, it is possible to easily remove the same in this way from the liquid phase of the wort WO.

After a predetermined retention time tS or a predetermined separation rate of the solid matter has been achieved, the clarified wort WO is withdrawn via the at least one outlet opening AKVB of the container KVB. Here it is advantageous, if the container KVB has a plurality of outlet openings AKVB which are arranged at different heights of the container KVB. Since the clarification of the wort in the clarification device KV proceeds from the top downwards by nature, that is, in the upper region of the container KVB the wort WO clarifies at the fastest, the withdrawal of the wort WO via the different outlet openings AKVB may advantageously be continued step by step in downward direction. By doing so, a further improved clarification effect and an acceleration of the clarifying step under consideration of the withdrawal from the clarification device KV is achieved. The withdrawn clarified wort WO is then supplied to the wort cooler as the second apparatus WK2 and is then cooled to pitching temperature as described above.

Figure 4:
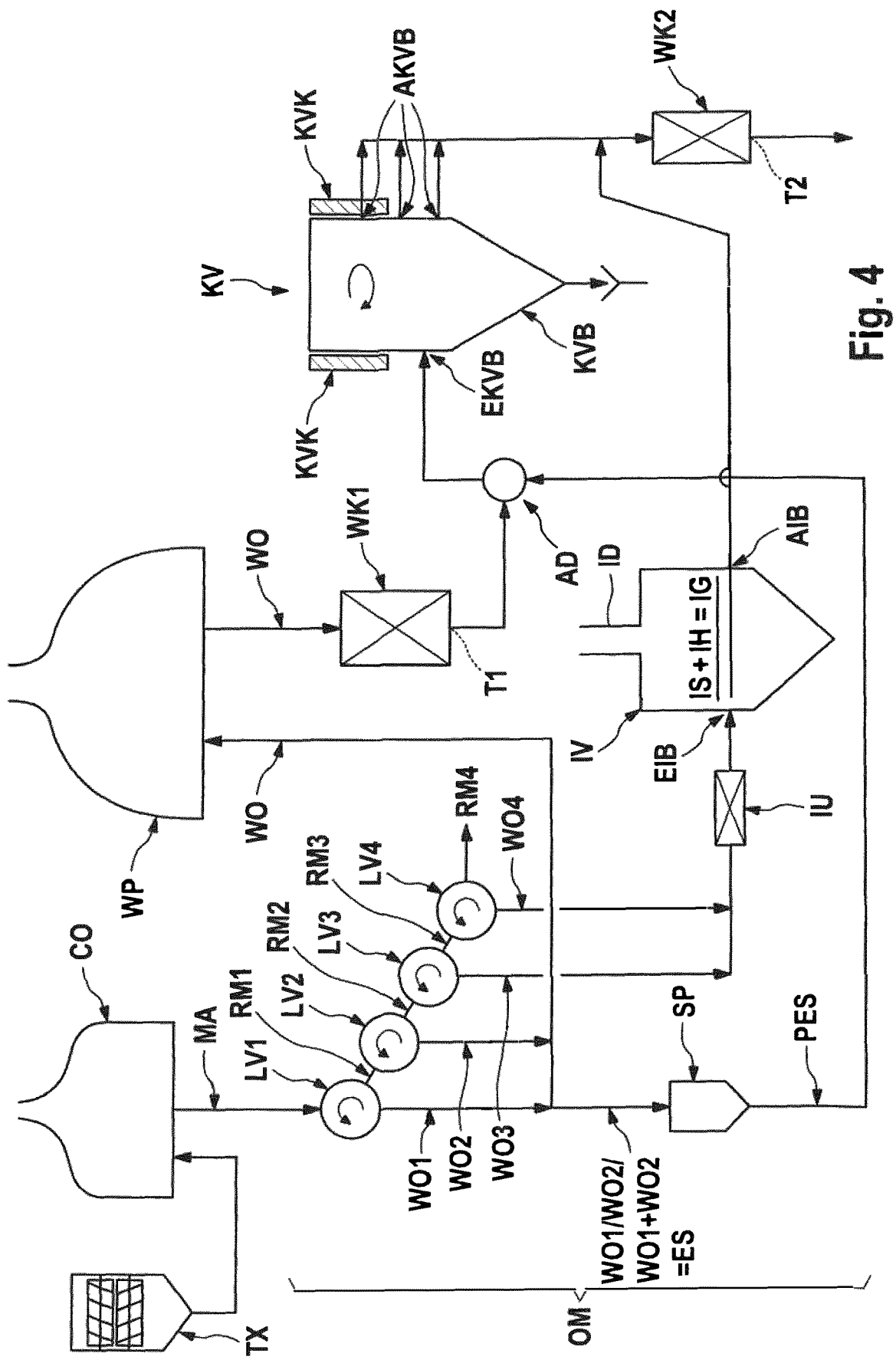
Figure 5:
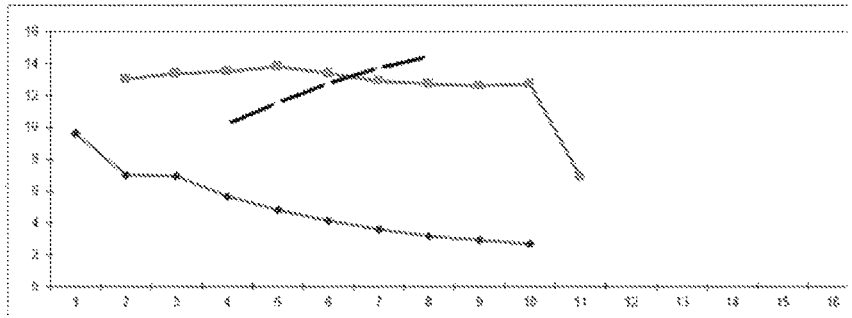
FIG. 5 is a Fermentation diagram of a wort obtained by means of conventional deep filtration.
Figure 6:
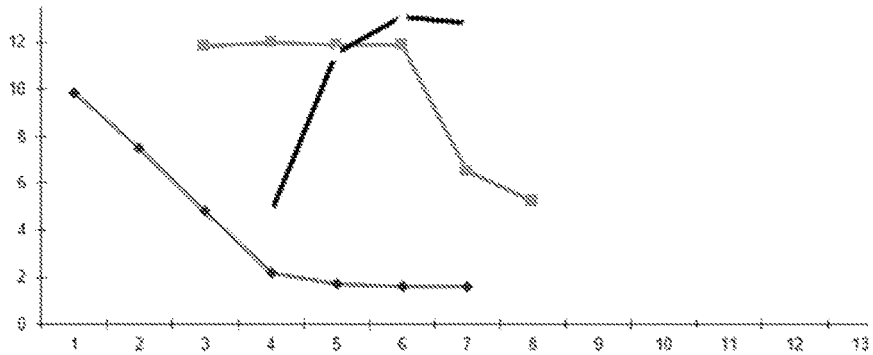
FIG. 6 is a Fermentation diagram of the present disclosure.
Figure 7:
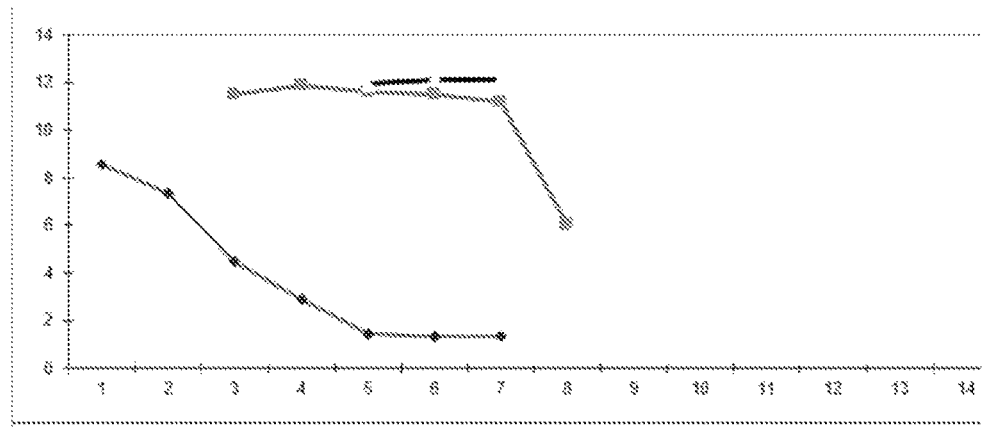
FIG. 7 is a Fermentation diagram of the present disclosure.

FIG. 4 shows a fourth embodiment of the brewing plant OM according to the invention. The brewing plant OM and the method according to this embodiment are based on the same principle as the first embodiment, so that herein below only differences to the first embodiment as described above are discussed.

Thus, the brewing plant OM according to this embodiment, further comprises an isomerization apparatus IV for isomerizing of isomerizable hop components in an isomerization substrate IS, as is described above in an exemplary way in context with the second embodiment. Moreover, the brewing plant OM further comprises a clarification device KV for at least partially separating solid matter from the wort WO, as is described above in an exemplary way in context with the third embodiment.

In conclusion, as regards the device aspects, the brewing plant OM according to this embodiment combines the features and advantages of the combination of the lauter device LV, comprising at least the first lauter device LV1, or a plurality of such lauter devices: the second device V2, the isomerization device IV and the clarification device KV, respectively as described above.

Referring to the method, this embodiment combines the features and advantages of the combination of the first partial method TV1 for obtaining a wort WO from a mash MA, of the second partial method TV2 for treating the wort WO, of the third partial method TV3 for hopping of the wort WO or of a beverage produced thereof or a precursor thereof, and of the fourth partial method TV4 for at least partially clarifying the wort WO.

A fifth embodiment of the present invention is a method VO which links the following combinations of the partial methods according to the invention, respectively with the fifth partial method TV5:
 the first partial method TV1 and the second partial method TV2;
 the first partial method TV1 and the second partial method TV2 and the third partial method TV3;
 the first partial method TV1 and the second partial method TV2 and the fourth partial method TV4; or
 the first partial method TV1 and the second partial method TV2 and the third partial method TV3 and the fourth partial method TV4.

Therein, the wort WO having a content of solid matter F of less at least 300 mg/L and obtained in the first partial method TV1 is mixed with an additive Z obtaining a wort WO being enriched with the additive Z. This enriched wort WO is exposed to a thermal treatment, that this, keeping hot or boiling of the enriched wort WO as previously described, preferably to the conventional wort boiling. It is advantageous to at least partially remove the solid matter F contained in the enriched wort WO to a content of solid matter F of 100 mg/L or less, prior to the addition of a hop substrate IH or of the mixture IG which has been separately isomerized according to the third partial method TV3. Therein, the additive Z obviously removes also particles of the fine turbidity and the relevant amount, thereby the yield of the hopping carried out later is improved.

Adding of the hop substrate IH is carried out preferably 5 to 15 minutes prior to completion of the thermal treatment of the enriched wort WO. This period of time should be sufficient in order to ensure a sufficient isomerization of the hop substrate IH. Since the mixture IG which has been separately isomerized according to the third partial method TV3 is already pre-isomerized to a sufficient extent, alternatively, the mixture IG may be added after the completion of the thermal treatment of the wort WO, preferably after the hot trub separation.

Therein, the the enzyme-containing substrate ES according to the second partial method TV2 may be added to the wort WO or enriched wort WO.

Appendix

Measurement of the Particle Size Distribution

The analysis was conducted by means of the laser scattering sensor HELOS of the company Sympatec GmbH in combination with the automatic wet dispersing unit SUCELL. In combination, the sensor has a measurement range of 0.1 to 875 µm. The selection of the lens R4 having a range of 0.5/1.8 µm to 350 µm is used for further limiting the measurement range. The sample was excited by means of a HeNe laser having a wavelength of $\Lambda=632.8$ nm. The analysis of the measurement signals was carried out by means of the device's own software.

The chronological sequence of the particle measurement is presented herein below:

1. Introducing of 400 mL of deionized water into the dispersing unit.
2. Deaerating the dispersing unit for 10 seconds.
3. Pumping for 30 seconds.
4. Signal test (reference).
5. Adding of the sample by means of a measuring pipette (up to an optical concentration of approximately 15%).
6. Deaerating the dispersing unit for 10 seconds.
7. Pumping for 120 seconds for dispersing.
8. Measurement 1 (measurement time: 60 seconds).
9. Pumping for 60 seconds.
10. Measurement 2 (measurement time: 60 seconds).
11. Pumping for 60 seconds.
12. Measurement 3 (measurement time: 60 seconds).
13. Discharging and rinsing of the dispersing unit.

The invention claimed is:

1. A brewing plant for continuously or discontinuously obtaining and treating a wort in the beer brewery or beverage industry, the wort containing a first wort, the brewing plant comprising:
   at least one first lauter device for continuously or discontinuously obtaining a first wort from a mash, at least comprising:
      a first receiving unit for receiving the mash;
      at least one first separator, each having a first surface, the first surface having a plurality of openings;
      the first lauter device continuously or discontinuously separating the mash into the first wort and a first residual phase by the first surface of the first separator;
      the first surface or a part thereof being able to be brought into contact with the mash, if the mash is present in the first receiving unit, for separation into the first wort and the first residual phase;
      during the operation of the first lauter device, the first surface being movable or rotatable relative to the mash received in the first receiving unit, to the first residual phase and/or to the first receiving unit;

the brewing plant further comprising a second device, wherein the second device comprises:
   a first temperature setting device for setting the wort to a first temperature between 0 and 85° C. after completing heating or boiling of the wort; and
   an adding device for adding at least one portion of an enzyme-containing substrate, which has not been heated to more than 80° C., to the wort obtained after setting the first temperature;
   the first temperature setting device being arranged downstream from an apparatus for heating or boiling of the wort; and
   the adding device being arranged downstream to the first temperature setting device.

2. The brewing plant according to claim 1, wherein the device for adding the at least one portion of the enzyme-containing substrate is arranged upstream or downstream with respect to or at a clarifying device for at least partially clarifying the wort.

3. The brewing plant according to claim 1, wherein the brewing plant further comprises at least one isomerization device for isomerizing isomerizable hop components in an isomerization substrate, comprising:
   a container for receiving the isomerization substrate or a mixture containing the isomerization substrate;
   the container having an inlet opening for introducing the isomerization substrate or the mixture into the container, the inlet opening being in fluid connection with at least one of the first lauter device, a second lauter device, a third lauter device, and a fourth lauter device;
   the container having an outlet opening for withdrawing the isomerization substrate or the mixture from the container;
   the outlet opening being in fluid connection with a vessel that carries beer or wort;
   an outlet vent discharging steam or mist of the isomerization substrate or of the mixture from the container; and
   a second temperature setting device for setting the temperature of the isomerization substrate or of the mixture;
   the container being separate from the apparatus for heating or boiling the wort produced in the brewing plant; and
   the container having an effective volume of 60% or less of the apparatus for heating or boiling the wort produced in the brewing plant.

4. The brewing plant according to claim 1, wherein the brewing plant comprises at least one clarification device for at least partially separating solids from the wort, where the wort has a temperature of at least 50° C.;
   the clarification device having a container for receiving the wort;
   the container being arranged downstream to the apparatus for heating or boiling of the wort;
   the container being arranged upstream to a cooling device for cooling the wort;
   the container having at least one inlet opening for introducing the wort into the container;
   the container having at least one outlet opening for withdrawing the wort from the container; and
   the clarification device having a facility for cooling the wort being present in an upper or lower half of the container.

5. A method for continuously or discontinuously obtaining and treating a wort in the beer brewery or beverage industry;

the wort containing a first wort;

wherein the method comprises a first partial method for obtaining the wort from a mash, at least having the steps of:

(1a) continuously or discontinuously supplying the mash to a first lauter device as defined in claim 1;

(1b) continuously or discontinuously separating the mash in the first lauter device by at least one first separator into the first wort and a first residual mash;

the mash is brought in contact with a first surface of the at least one separator, a filtrate or permeate is the first wort and a filter residual or retentate is the first residual mash;

wherein during separation of the mash into the first wort and the first residual mash, the first surface moves relative to the mash; or during the separation of the mash into the first wort and the first residual mash, the first surface rotates around a first axis of the first separator; and during the entire duration of the separation of the mash, the relative movement or rotational movement of the first surface is effected in an uninterrupted or intermittent manner;

the first wort having a content of solid matter of at least 300 mg/L;

the method further including a second partial method for treating the wort obtained in the first partial method, at least comprising the steps of:

(2a) after a thermal treatment of the wort obtained in the first partial method, setting the temperature of the wort to a first temperature between 0 and 85° C.; and (2b) adding at least one portion of an enzyme-containing substrate that has been heated to not more than 80° C. to the wort;

the wort having the first temperature or lower at the time of adding; and the second partial method being carried out by using the second device, as defined in claim 1.

6. The method according to claim 5, wherein the first partial method further comprises the steps of:

(1c) mixing of water or a diluted wort, which is a third wort, with the first residual mash obtained at the separation according to step (1b), in a predefined volumetric flow ratio, whereby a first mixture is obtained;

(1d) prior to step (1c): continuous or discontinuous supplying the first residual mash to a second receiving unit of a second lauter device;

(1e) after step (1c): continuous or discontinuous supplying the first mixture to the second receiving unit of the second lauter device;

wherein the second lauter device has a shape which is identical to the first lauter device;

(1f) continuous or discontinuous separating of the thus obtained first mixture into a second wort and a second residual mash by separating or filtrating the first mixture by use of a second surface of the second separator in the second lauter device;

the filtrate or permeate being the second wort and the filter residual or the retentate being the second residual mash;

the separation being driven by the hydrostatic pressure of the first mixture and/or another pressure acting upon the first mixture and/or a negative pressure acting upon a second residual phase;

during the separation of the first mixture into the second wort and the second residual phase, the second surface moves relative to the first mixture present in the second lauter device, to the second residual phase present in the second lauter device and/or to the second receiving unit, or during the separation of the first mixture into the second wort and the second residual phase, the second surface rotates about a second axis of the second separator; and the relative movement or the rotational movement of the second surface is effected in an uninterrupted or intermittent manner during the entire period of separation of the first mixture.

7. The method according to claim 5, wherein the second partial method further comprises the step: (2c) at least partially clarifying the wort, the adding step according to step (2b) is carried out prior to the at least partial clarification of the wort.

8. The method according to claim 5, wherein the second partial method further comprises the step:

(2f) after adding according to step (2b) and allowing a predetermined duration of time to lapse: heating the wort to a third temperature between 82 and 99° C.

9. The method according to claim 5, wherein the method further comprises a third partial method for hopping of the wort or of a beer or beverage obtained thereof or of a precursor thereof;

the third partial method at least comprises the steps:

(3a) providing an isomerization substrate containing a wort, the wort having an extract content in the range from 0.2 to 8° P, the isomerization substrate having a content of coarse particles having particles sizes of 40 to 400 μm of more than 100 mg/L;

(3b) heating of the isomerization substrate to a temperature between 80 and 105° C.;

(3c) mixing the isomerization substrate with a hop substrate, thereby obtaining a mixture;

the hop substrate containing at least one isomerizable hop component that is at least one α acid;

(3d) setting the temperature of the resulting mixture to a temperature within a range between 80 and 105° C.;

the temperature range including the temperatures from 15° C. below to 2° C. below a maximum temperature attained by the wort during the thermal treatment of the same in a beer manufacturing method which includes the third partial method; and maintaining the temperature of the resulting mixture within the range for a predetermined period of time;

(3e) at least partly separating of solid components from the mixture obtained in step (3d); and (3f) mixing the mixture obtained in step (3c) or (3d) or (3e), with the wort, which is obtained according to the second partial method, or with a beer or beverage resulting from the wort, or with a precursor thereof;

prior to the mixing of the mixture with the wort, the wort was thermally treated separately from the mixture for at least 30 minutes, the wort was exposed to the temperature as the maximum temperature.

10. The method according to claim 5, wherein the method further includes a fourth partial method for at least partially clarifying the wort;

the fourth partial method at least includes the steps:

(4a) introducing the wort to be clarified in a container for receiving the wort through at least one inlet opening;

the wort flowing into the container having a temperature of at least 50° C.;

(4b) allowing the wort to rest in the container for a predetermined period of time, the solid matter contained in the wort sediments at least partly;

(4c) withdrawing the resulting, clarified wort from the container through at least one outlet opening; and during the step (4b), the wort present in the container or a partial volume thereof is cooled in the area of an upper or lower half of the container.

11. The method according to claim 5, wherein the method has a fifth partial method for treating a wort containing solid matter for hopping of a wort;

the fifth partial method at least comprises the steps:

(5a) providing the wort according to the first partial method; and (5b) mixing of the wort with an additive, thereby obtaining a wort containing the additive, prior to step (2a) or prior to or during step (2d) according to the second partial method;

the additive contains at least one material, selected from a group, including a hop trub, a hot trub, a cold trub, a kieselguhr, a silica gel, a PVPP, a bentonite, rice bowls, cereal bowls, wood chips, activated carbon, natural hops, hop pellets, and solid components of natural hops or of hop pellets.

12. A method for continuously or discontinuously obtaining and treating a wort in the beer brewery or beverage industry, the wort containing a first wort;

the method comprising a first partial method for obtaining the wort from a mash, at least having the steps:

(1a) continuously or discontinuously supplying the mash to a first receiving unit of a first lauter device;

(1b) continuously or discontinuously separating the mash in the first lauter device by separating or filtrating the mash by at least one separator, including a first surface of the a separator, into a first wort and a first residual mash, the filtrate or permeate being the first wort and the filter residual or retentate being the first residual mash;

the separation being driven by hydrostatic pressure of the mash and/or by another pressure acting on the mash and/or by a negative pressure acting on the first residual mash;

during separation of the mash into the first wort and the first residual mash, the first surface of the first separator moves relative to the mash present in the first lauter device, to the first residual mash present in the first later device and/or to the first receiving unit; or, during separation of the mash, the first surface rotates around a first axis of the first separator; and during the entire duration of the separation of the mash, the relative movement or rotational movement of the first surface is effected in an uninterrupted or intermittent manner;

the first wort has a content of solid matter of at least 300 mg/L;

the method further including a second partial method for treating the wort obtained in the first partial method, at least comprising the steps:

(2a) after a thermal treatment of the wort obtained in the first partial method, setting the temperature of the wort to a first temperature between 0 and 85° C.; and (2b) adding at least one portion of an enzyme-containing substrate that has been heated to not more than 80° C. to the wort;

wherein the wort has the first temperature at most at the time of adding.

13. The method according to claim 12, wherein the method further comprises a third partial method for hopping of the wort or of a beer or of a beverage obtained thereof or of a precursor thereof;

the third partial method at least comprises the steps:

(3a) providing an isomerization substrate containing a wort wherein the wort has an extract content in the range from 0.2 to 8° P, the isomerization substrate having a content of coarse particles having particle sizes of 40 to 400 μm of more than 100 mg/L;

(3b) mixing of the isomerization substrate with a hop substrate, thereby obtaining a mixture;

the hop substrate containing at least one isomerizable hop componentthat is at least one α acid;

(3c) setting the temperature of the resulting mixture to a temperature within the range of 80 to 105° C.;

the temperature range includes the temperatures from 15° C. below to 2° C. below a maximum temperature attained by the wort during the thermal treatment of the same in a beer manufacturing method which includes the third partial method; and (3d) maintaining the temperature of the resulting mixture within the range for a predetermined period of time;

(3f) mixing the mixture obtained in step (3b) or (3c) or (3d) or (3e) with the wort, which is obtained according to the second partial method, or with a beer or beverage resulting from the wort, or with a precursor thereof;

prior to the mixing of the mixture with the wort, the wort was thermally treated separately from the mixture for at least 30 minutes, the wort was exposed to the temperature as the maximum temperature.

14. A method of treating a wort comprising the steps of:

adding an enzyme-containing substrate that has not been heated to more than 80° C. to a wort;

the wort having a content of solid matter of at least 300 mg/L; and the wort is obtained by surface filtration.

* * * * *

UNITED STATES PATENT AND TRADEMARK OFFICE
CERTIFICATE OF CORRECTION

PATENT NO. : 11,976,258 B2
APPLICATION NO. : 16/345502
DATED : May 7, 2024
INVENTOR(S) : Klaus Gehrig et al.

It is certified that error appears in the above-identified patent and that said Letters Patent is hereby corrected as shown below:

In the Specification

Column 5
Line 59          Delete "s" and insert --β--
Line 62          Delete "P" and insert --β--

Column 6
Line 22          After "or", insert --15--

Column 8
Lines 8-9          Delete "90 0," and insert --90°,--
Line 10          Delete "90 0," and insert --90°,--
Line 10 (2$^{nd}$ occurrence)          Delete "90 0," and insert --90°,--
Line 31          Delete "40%," and insert --30 to 40%,--
Line 41          After "preferably", insert --45--

Column 9
Line 10          After "and/or", insert --¶--
Line 50          Delete "30 0," and insert --30°,--

Column 10
Line 25          After "preferably", insert --10--
Line 41          Delete "FA1 1, FIA2;" and insert --FA11, F1A2;--
Line 64          Delete "20," and insert --20°,--
Line 66          Delete "LTI2" and insert --LT12--

Column 11
Line 2          Delete "FAI11" and insert --FA11--
Line 30          Delete "FA I" and insert --FA1--

Signed and Sealed this
Thirtieth Day of July, 2024

Katherine Kelly Vidal
*Director of the United States Patent and Trademark Office*

Column 12
Line 50              After "in", delete "¶"

Column 14
Line 66              Delete "WZL," and insert --WZ1,--

Column 15
Line 55              After "preferably", insert --45--

Column 16
Line 57              After "and", insert --¶--

Column 18
Line 7               Delete "WII" and insert --WH--
Line 12              Delete "TB;" and insert --IB;--
Line 35              Delete "1H." and insert --IH.--

Column 23
Line 39              After "a", delete "¶"

Column 25
Line 20              Delete "(1$iq$)" and insert --(1$q$)--

Column 26
Line 16              Delete "(1)," and insert --(1$f$),--
Lines 66-67          Delete "0 C." and insert --0 °C.--

Column 27
Line 55              Delete "8° P," and insert --8 °P,--
Line 56              Delete "5° P;" and insert --5 °P;--

Column 28
Line 3               Delete "93" and insert --93 °C.--
Line 5               Delete "15 25° C." and insert --15 °C.--
Line 62              Delete "15 25° C." and insert --15 °C.--

Column 33
Line 45              Delete "Table I" and insert --Table 1--

Column 34
Line 32              Delete "ofthis," and insert --of this,--
Line 35              Delete "Moreovcr," and insert --Moreover,--
Line 36              Delete "wo" and insert --wort--

Column 40
Line 46              Delete "cffort" and insert --effort--

CERTIFICATE OF CORRECTION (continued)
U.S. Pat. No. 11,976,258 B2

Column 45
Line 14        Delete "isomcrisation." and insert --isomerisation.--

In the Claims

Column 57
Line 27, Claim 13    Delete "componentthat" and insert --component that--
Line 37, Claim 13    After "time;", insert --¶(3e) at least partly separating solid components from the mixture obtained in step (3d); and--